(12) United States Patent
Hampapur et al.

(10) Patent No.: US 12,093,858 B1
(45) Date of Patent: Sep. 17, 2024

(54) DYNAMIC TRUST-BASED AUTHORIZATION SYSTEM

(71) Applicant: Bloom Value Corporation, Norwalk, CT (US)

(72) Inventors: Arun Hampapur, Norwalk, CT (US); Sampoorna Hegde, Bengaluru (IN); Megha Kuchhal, Bengaluru (IN); Roona Shree, Bengaluru (IN); Praveen Guledgudda, Bengaluru (IN); Sharathchandra Pankanti, Darien, CT (US); Shravan Conjeevaram, Bengaluru (IN); Blair Bryson, San Bernardino, CA (US)

(73) Assignee: Bloom Value Corporation, Norwalk, CT (US)

( * ) Notice: Subject to any disclaimer, the term of this patent is extended or adjusted under 35 U.S.C. 154(b) by 0 days.

(21) Appl. No.: 18/186,170

(22) Filed: Mar. 19, 2023

(51) Int. Cl.
*G06Q 10/00* (2023.01)
*G06Q 10/0631* (2023.01)

(52) U.S. Cl.
CPC .......................... *G06Q 10/063112* (2013.01)

(58) Field of Classification Search
None
See application file for complete search history.

(56) References Cited

U.S. PATENT DOCUMENTS

| 11,436,647 | B1* | 9/2022 | Null | G06Q 30/02 |
| 2021/0090717 | A1* | 3/2021 | Manuel | G06F 16/955 |
| 2021/0092161 | A1* | 3/2021 | Crabtree | H04L 63/1433 |
| 2021/0327586 | A1* | 10/2021 | Tomchik | G16H 40/20 |

OTHER PUBLICATIONS

Yang, J., & Qin, Q. (2017). A User-oriented Access Control Model for Medical Association Cloud Platform. Management & Engineering, (27), 9. (Year: 2017).*

* cited by examiner

*Primary Examiner* — Matheus Ribeiro Stivaletti
(74) *Attorney, Agent, or Firm* — Kevin J Fournier Intellectual Property Legal Services Ltd.; Kevin J Fournier

(57) ABSTRACT

Configurations of a system and a method for a dynamic trust-based authorization system (DTBAS), are described. In one aspect, the DTBAS may implement an execution of operations of multiple engines, models, framework, circuits, code, etc., for dynamically authorizing a request for a service or an operation. The DTBAS, when deployed in a managing entity, may receive a request from a managed entity to execute an operation or task. Based on parameters or attributes associated with the managed entity, the DTBAS may execute operations to evaluate a trust score. Based on the evaluated trust score, the DTBAS may compute a weight decision matrix that may include multiple weights associated with the managed entity. Based on the computed weight decision matrix and the evaluated trust score, the DTBAS may authorize or deny the execution of the requested operation.

14 Claims, 18 Drawing Sheets

FIG. 9B

Overall BenchMark

| Auth Category | | | Attributed | | | Direct | | | Total | |
|---|---|---|---|---|---|---|---|---|---|---|
| Year | #Auth | #Member | Auth Per 100 Member | CPT Per 100 Member | #Auth | #Member | Auth Per 100 Member | CPT Per 100 Member | #Auth | #Member |
| ⊞ 2021 | 71019 | 101772 | 69.78 | 221.51 | 64154 | 97909 | 65.52 | 213.46 | 135173 | 102063 |
| ⊞ 2022 | 48197 | 129441 | 37.23 | 123.71 | 44122 | 125435 | 35.18 | 128.53 | 92317 | 129677 |
| Total | 119216 | 188065 | 63.39 | 205.02 | 108276 | 181532 | 59.65 | 203.94 | 227490 | 188515 |

⎫ 1002

Auth YoY :: Member PCP : All :: Referring To Specialty : All

| Auth_type | | | Attributed | | | | |
|---|---|---|---|---|---|---|---|
| Month | #Auth Last Year | #Member Last Year | Auth Per 100 Member Last Year | #Auth Current Year | #Member Current Year | Auth Per 100 Member Current Year | #Auth La |
| January | 4722 | 89282 | 5.29 | 6277 | 117101 | 5.36 | 420 |
| February | 5013 | 90696 | 5.53 | 6420 | 117620 | 5.46 | 430 |
| March | 5882 | 1476 | 6.43 | 7231 | 127287 | 5.68 | 536 |
| April | 5773 | 93966 | 6.14 | 5695 | 129030 | 4.41 | 515 |
| May | 5153 | 94090 | 5.48 | 5524 | 131905 | 4.19 | 446 |
| June | 5925 | 96002 | 6.17 | 6049 | 140498 | 4.31 | 515 |
| July | 6387 | 107852 | 5.92 | 5410 | 143171 | 3.78 | 720 |
| August | 6663 | 108842 | 6.12 | 5968 | 128912 | 4.63 | 606 |
| September | 6705 | 110088 | 6.09 | 4482 | 0 | 0.00 | 544 |
| October | 6426 | 110887 | 5.80 | 688 | 0 | 0.00 | 563 |
| November | 5780 | 113343 | 5.10 | 1290 | 0 | 0.00 | 515 |
| December | 6630 | 114735 | 5.78 | 2637 | 129441 | 0.00 | 601 |
| Total | 71059 | 101772 | 69.82 | 57671 | | 44.55 | 641 |

| Auth No | Requested Date | CPT Code | CPT Code Desc. | BV_recom | Member PCP Org Name | Org_Rating | Member PCP | Member_ID | Diagnosis Description |
|---|---|---|---|---|---|---|---|---|---|
| 20180720T8800011 | 07/19/18 08:49 AM | K0040 | ADJUSTABLE ANGLE FOOTPLATE EAC | Review | ▮ | Medium Utilization | ▮ | ID_KEY_18359 | Z8739 PERSONAL HISTORY OTHER DISEASES OF THE MUSCULOSKELETAL SYSTEM AND CONNECTIVE TISSUE UNSPECIFIED INTELLECTUAL DISABILITIES;G40909 EPILE UNSPECIFIED, NOT INTRACTABLE, WITHOUT EPILEPTICUS |
| 20180720T8800011 | 07/19/18 08:49 AM | E2611 | GEN WC BACK CUSHN WIDTH < 22 I | Review | ▮ | Medium Utilization | ▮ | ID_KEY_18359 | Z8739 PERSONAL HISTORY OTHER DISEASES OF THE MUSCULOSKELETAL SYSTEM AND CONNECTIVE TISSUE UNSPECIFIED INTELLECTUAL DISABILITIES;G40909 EPILE UNSPECIFIED, NOT INTRACTABLE, WITHOUT EPILEPTICUS |
| 20180720T8800011 | 07/19/18 08:49 AM | E0951 | HEEL LOOP/HOLDER ANY TYPE EACH | Review | ▮ | Medium Utilization | ▮ | ID_KEY_18359 | Z8739 PERSONAL HISTORY OTHER DISEASES OF THE MUSCULOSKELETAL SYSTEM AND CONNECTIVE TISSUE UNSPECIFIED INTELLECTUAL DISABILITIES;G40909 EPILE UNSPECIFIED, NOT INTRACTABLE, WITHOUT EPILEPTICUS |
| 20180720T8800011 | 07/19/18 08:49 AM | E2231 | MNI WC ACCESS SOLID | Review | | Medium Utilization | | ID_KEY_18359 | Z8739 PERSONAL HISTORY |

| Auth No | Requested Date | CPT Code | CPT Code Desc. | ▲BV_recom | Member PCP Org Name | Org_Rating | Member PCP | Member_ID |
|---|---|---|---|---|---|---|---|---|
| 17089112 | 03/30/17 12:00 AM | 99215 | OFFICE/OUTPATIENT VISIT EST | Approve | ■ | High Utilization | ■ | ID_KEY_10842 |
| 17089112 | 03/30/17 12:00 AM | 99205 | OFFICE/OUTPATIENT VISIT EST | Approve | ■ | High Utilization | ■ | ID_KEY_10842 |
| 17215142 | 08/03/17 12:00 AM | 95956 | EEG MONITOR TECHNOL ATTENDED | Approve | ■ | Medium Utilization | ■ | ID_KEY_64337 |
| 17215142 | 08/03/17 12:00 AM | 99213 | OFFICE/OUTPATIENT VISIT EST | Approve | ■ | Medium Utilization | ■ | ID_KEY_64337 |
| 17215142 | 08/03/17 12:00 AM | 99215 | OFFICE/OUTPATIENT VISIT EST | Approve | ■ | Medium Utilization | ■ | ID_KEY_64337 |
| 20180410706000530000019 | 04/10/18 10:24 AM | 69436 | CREATE EARDRUM OPENING | Approve | ■ | Low Utilization | ■ | ID_KEY_19039 |
| 20180410706000530000019 | 04/10/18 10:24 AM | 92504 | EAR MICROSCOPY EXAMINATION | Approve | ■ | Low Utilization | ■ | ID_KEY_19039 |
| 201807171788000094 | 07/17/18 02:07 PM | 99245 | OFFICE CONSULTATION | Approve | ■ | Low Utilization | ■ | ID_KEY_100616 |

FIG. 12

DYNAMIC TRUST-BASED AUTHORIZATION SYSTEM

FIELD

Various embodiments of the disclosure relate to an artificial intelligence (AI) based dynamic trust-based authorization system (DTBAS). More specifically, the DTBAS implements operations for measuring, analyzing, quantifying, and performing computations on multi-dimensional data to enable an execution of trust-based authorizations for executing tasks or operations between multiple entities in real time.

BACKGROUND

Large ecosystems or organizations may work in collaboration with smaller entities to manage certain operations or tasks. In certain scenarios, the large ecosystems may collaborate with one or more intermediate entities to execute certain operations or tasks. The smaller entities, for example, may be dependent on the intermediate entities for providing clarifications, information authorizations, etc., for executing the operations or tasks. Managing such dependencies may not only be cumbersome, but also may affect the cost of operations in the long term. For example, there may be administrative overheads in terms of costs, employing human resources with specific knowledge or skills, challenges, or setbacks due to human errors caused by oversights or missing vital information that may add to a further delay in the execution of the tasks or operations. Additionally, certain tasks or operations may need human interventions at multiple stages that are deliberated by additional scrutinization. Therefore, automating such dependencies and the execution of certain tasks or operations, especially related to authorizations based on a trust, may be challenging.

The limitations and disadvantages of conventional and traditional approaches will become apparent to one of skill in the art, through comparison of described systems with some aspects of the present disclosure, as set forth in the remainder of the present application and with reference to the drawings.

SUMMARY

A method, a system, and a non-transitory computer readable for dynamic trust-based authorization system (DTBAS) of a request, is described. In an embodiment, the DTBAS may be deployed in an entity, such as a hospital ecosystem. At a managing entity (e.g., a hospital), a request from a managed entity (e.g., a service provider) for performing or executing a service or an operation or a task may be received. The received request may be processed and one or more parameters associated with the managed entity may be determined. Further, based on one or more parameters associated with the managed entity, the DTBAS may compute a, for example, normalized trust score. The normalized trust score may be computed based on multi-dimensional computations on data from multiple data sources in multiple dimensions. Based on the computed normalized trust score, a weighted decision matrix including one or more weights associated with the managed entity may be computed. In an embodiment, the weighted decision matrix may include an approvability score based on multiple factors associated with the managed entity. The weighted decision matrix includes data representing multiple decisions and an associated corresponding weight for each decision. Based on the computed weighted decision matrix and the computed normalized trust score, the execution of the at least one operation may be dynamically authorized. The dynamic authorization may enable the managed entity to execute the operations and perform tasks based on the request.

In an embodiment, the managed entity may be a service provider. The one or more parameters associated with the managed entity is one of an individual rating (also referred to as an individual provider trust score or individual service provider trust score), a group of service providers rating (also referred to as group of providers trust score or groups of service providers trust score), type of service provided by the service providers, adherence to compliance information, etc. In an embodiment, the one or more weights of the weighted decision matrix may be computed based on multidimensional data. For example, the multidimensional data may include multiple records associated with a historical information and a real time information associated with the requested operation or service or task. The one or more weights of the weighted decision matrix may be update dynamically in real time.

In an embodiment, the DTBAS may execute operations to display information including data on a dashboard or a graphical user interface. Such information may include the trust score associated with the individual service provider, the trust score associated with the group of service providers, historical information associated with the patients, etc. In an embodiment, the DTBAS may execute operations to dynamically refresh or update the data on the dashboard or the graphical user interface.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 9A and 9B are an illustration showing a dashboard that displays information based an analysis performed by the DTBAS, according to an exemplary embodiment.

FIG. 10 is an illustration showing a dashboard that displays information based on an analysis performed by the DTBAS, according to an exemplary embodiment.

FIG. 11 is an illustration showing a dashboard displaying information based on an analysis by the DTBAS, according to an exemplary embodiment.

FIG. 12 is an illustration showing a dashboard displaying information based on an analysis by the DTBAS, according to an exemplary embodiment.

DETAILED DESCRIPTION

Figure 1:
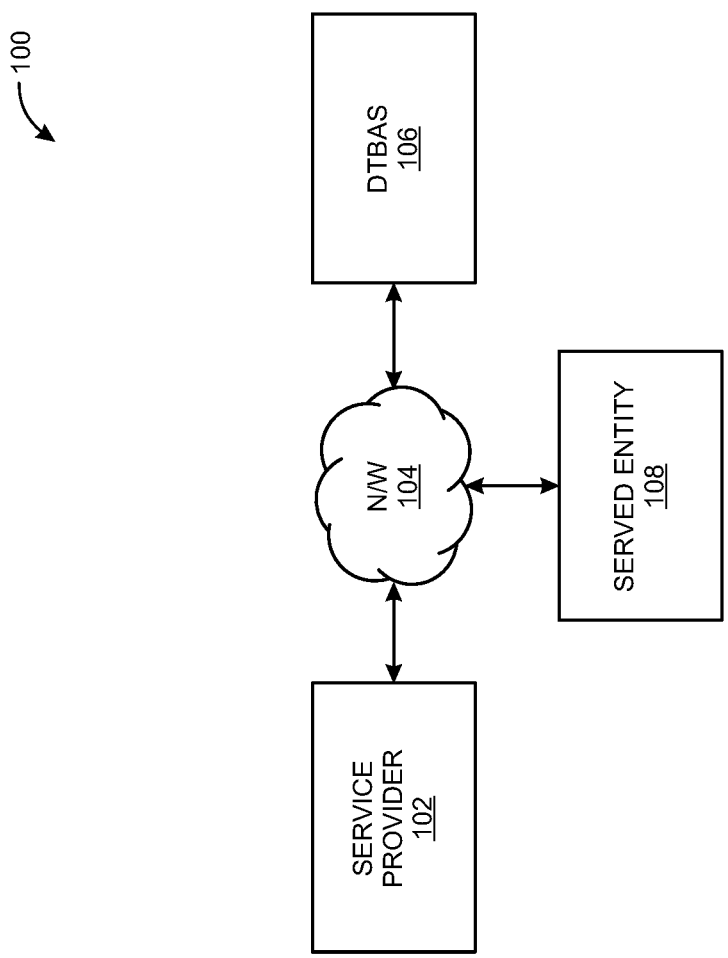
FIG. 1 is a block diagram illustrating an environment including a dynamic trust-based authorization system (DTBAS), according to an embodiment.

In the following description, for purposes of explanation, numerous specific details are set forth to provide a thorough understanding of the present disclosure. It will be apparent, however, to one skilled in the art that the present disclosure can be practiced without these specific details. In other instances, systems, apparatuses, and methods are shown in block diagram form only to avoid obscuring the present disclosure.

Reference in this specification to "one embodiment" or "an embodiment" or "example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The terms "comprise," "comprising," "includes," or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms machine learning model or machine learning engine may be used to refer to a computational or statistical or mathematical model or engine that is trained on machine learning modelling techniques. The machine learning model or the machine learning engine may be trained over a set of data and using an algorithm that it may use to learn, or model based on the information in the dataset.

The term artificial intelligence may be used to refer to a model built using simple or complex Neural Networks using deep learning techniques and computer vision algorithms. Artificial intelligence model learns from the data and applies that learning to achieve specific pre-defined objectives.

An artificial intelligence (AI) based dynamic trust-based authorization system (DTBAS) is described herein. The AI based DTBAS may also be referred to as DTBAS and may include an independent or collaborative execution of operations by multiple engines, models, circuitries executing logics, code, etc. An engine may correspond to a special purpose program or an executable code that enables execution of core and/or supplementary functions or operations. The engines described herein (e.g., dynamic trust rating engine, benchmarking engine, decision matrix weight learning engine, authorization decision and recommendation engine, provider group trust rating engine, individual provider trust rating engine, trust transference engine, trust rate aging engines, etc.) may execute specific operations or tasks either independently or in cooperation. A model or a means or a mechanism of modelling may include creating or improvising a functional or operational aspect of a system or features of the system by referencing an existing or known knowledge base. The outcome of the modeling process is to learn or train continually from the data, modifications in the data and optimize or improvise the functional or operational aspects of the system or features of the system.

In an embodiment, the operational aspects of the system may enable the execution of operations that may include, for example, determination, analysis, evaluation, quantification, and visualization. Modeling may be automated through a continual process of training the model with the data from multiple sources. The engines, the models, the circuitries executing logics, the code, etc. may implement an execution of the functions or operations based on configured rules and/or sequence of sequence of steps to produce specific outcomes. In an embodiment, the DTBAS may adapt to execute operations based on the data, modifications, or changes in the data. For example, computing metrics that may be associated with trustworthiness may include adapting with the input data, the modifications of the data, one or more rules, one or more policies, etc. In an embodiment, the term automatic in the subject specification may correspond to the adaption that may be driven by engines, circuits, models, systems, etc., without any human intervention. The term real time may correspond to a system response that is immediate based on modifications in the data.

In an embodiment, a managing entity may also be referred to as a serving entity and a served entity may include, for example, a patient. The managing entity may manage or provide authorization to requests initiated by the managed entities who may provide services to the served entities. For example, the authorizations may be for executing operations, tasks, etc., to be performed by the managing entity. For instance, in a healthcare ecosystem, the served entities may include patients and the managing entities may include healthcare providers or hospitals. In an embodiment, managed entity may include a service provider, such as a medical insurance provider, a fiscal intermediary, etc.

FIG. 1 is a block diagram illustrating an environment 100 including a dynamic trust-based authorization system (DTBAS), according to an embodiment. With reference to FIG. 1, there is shown an environment 100 that includes a communicatively coupled arrangement of a service provider 102, a served entity 108, and a dynamic trust-based authorization system (DTBAS) 106 over a network 104. For example, the service provider 102 may be a healthcare service provider, providing multiple services. For example, the multiple services provided by the healthcare provider may include performing health diagnosis and recommending medical or surgical procedures, providing health check-ups, tracking and following up with patients that need constant care, etc. The service provider 102 may include multiple factions that may provide services or operate either independently or in cooperation. Each faction may include multiple personnel, for example, licensed professionals, doctors, relationship managers, nurses, hospital support staff or professionals, or any other professionals.

In an embodiment, the served entity 108 may be an end user, for example, a patient consuming the healthcare services provided by the service provider 102. Based on a prescreening or medical procedure diagnosis, the served entity 108 may request for the service from the service provider 102. The service provider 102 may either provide or deny the requested healthcare related services to the served entity 108 based on various parameters. For instance, such parameters may include executing operations such as performing computations, performing evaluations, analyzing data, and perform validations or verifications based on an authorization by the DTBAS 106. In an embodiment, the DTBAS 106 may be a computing system configured to provide authorization to the service provider 102 for providing the healthcare related services requested by the served entity 108.

For instance, the DTBAS 106 may be a computer system that may implement an execution of multiple engines, circuitries, modules, etc., to execute operations. For example, the operations may include that may include, for example, receiving information from the service provider 102, processing the information based on attributes or parameters and based on the attributes and parameters, authorize the service provider 102 to provide the requested healthcare related services by the DTBAS 106. When the DTBAS 106 provides the authorization to the service provider 102, the service provider 102 may provide the requested healthcare related services to the served entity 108. When the DTBAS 106 denies the authorization to the service provider 102, the service provider 102 may deny providing the requested healthcare related services to the served entity 108.

In an embodiment, the network 104 facilitating the communication between the service provider 102, the DTBAS 106 and the served entity 108 may include a wired, a wireless, or any combination of the wired and the wireless communication networks. For example, the wired or wireless communication networks may include a cellular, a Wi-Fi, internet, local area networks, or the like. In an embodiment, the network 104 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof. In an embodiment, multiple service providers, multiple served entities, and the DTBAS 106 may communicate over a network 104.

Figure 2:
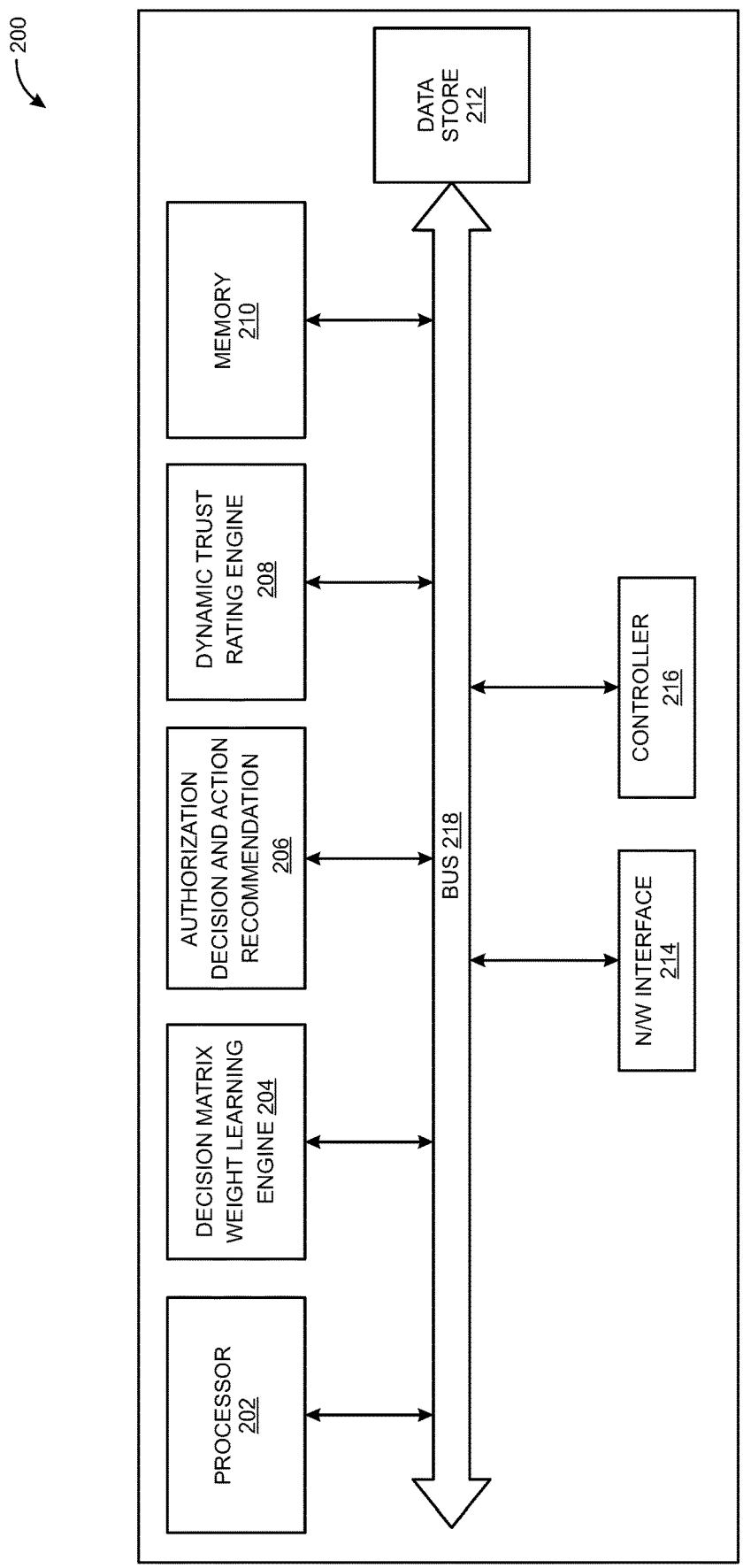
FIG. 2 is a block diagram illustrating a high-level dynamic trust-based authorization system (DTBAS), according to an exemplary embodiment.

FIG. 2 is a block diagram illustrating a high-level dynamic trust-based authorization system (DTBAS), according to an exemplary embodiment. With reference to FIG. 2, there is shown a high-level system diagram 200 including a DTBAS. In an embodiment, the DTBAS may include a processor 202, a decision matrix weight learning engine 204, an authorization decision and action recommendation engine 206, a dynamic trust rating engine 208, a memory 210, a datastore 212, a network interface 214, a controller 216, and a bus 218. In an embodiment, the DTBAS may include the processor 202 for processing information. The term "processor" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

In an embodiment, the processor 202 may be embodied in several diverse ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 2012 may include one or more processors configured in tandem via the bus to enable independent execution of instructions, pipelining and/or multithreading.

In an embodiment, the processor 202 may include one or more processors capable of processing large volumes of workloads and operations to provide support for big data analysis. In an example embodiment, the processor 202 may be in communication with the memory 210 via the bus 218 for passing information between the engines, models, circuitries, etc., of the DTBAS. In another embodiment, when the processor 202 is embodied as an executor of software instructions, the instructions may configure the processor 202 to execute instructions for perform the operations of algorithms and/or operations described herein. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202. In an embodiment, the DTBAS may include the decision matrix weight learning engine 204. The decision matrix weight learning engine 204 may use one or more parameters, multidimensional weighted decision data and cooperatively work with the authorization decision and action recommendation engine 206 to enable providing or denying authorization to the service provider 102.

In an embodiment, the DTBAS may include the memory 210 storing information and instructions to be executed by processor 202. The term "memory" used herein may refer to any computer-readable storage medium, for example, volatile memory, random access memory (RAM), non-volatile memory, read only memory (ROM), or flash memory. The memory may include a Random-Access Memory (RAM), a Read-Only Memory (ROM), a Complementary Metal Oxide Semiconductor Memory (CMOS), a magnetic surface memory, a Hard Disk Drive (HDD), a floppy disk, a magnetic tape, a disc (CD-ROM, DVD-ROM, etc.), a USB Flash Drive (UFD), or the like, or any combination thereof. The memory 210 may be non-transitory and may include, for example, one or more volatile and/or non-volatile memories. Further, the memory 206 may be an electronic storage device (for example, a computer readable storage medium) including gates configured to store data (for example, bits) that may be retrievable by a machine (for example, a computing device like the processor 202). The memory 210 may be configured to store information, data, contents, applications, instructions, or the like, for enabling the apparatus to conduct or perform or execute various functions in accordance with an example embodiment of the present disclosure. For example, the memory 210 could be configured to buffer input data for processing by the processor 202. As exemplarily illustrated in FIG. 2, the memory 210 may be configured to store instructions for execution by the processor 202. As such, whether configured by hardware or software methods, or by a combination thereof, the processor 202 may represent an entity (for example, physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein.

In an embodiment, the DTBAS may include the datastore 212. The instructions received by memory 210 may optionally be stored on datastore 212 either before or after execution by processor 202. The datastore 208 may be a magnetic disk, an optical disk, or a USB thumb drive (e.g., flash drive), or any other suitable computer readable storage medium. In an embodiment, the DTBAS may include the bus 218 for communicating information or instructions. The processor 202, the memory 210, the datastore 212, and the network interface 214 may communicate with each other via the bus 218.

In an embodiment, the DTBAS may include the network interface 214. The network interface 214 may provide a two-way data communication coupling to a network link. For example, network interface 214 may be an integrated services digital network (ISDN) card, cable modem, satellite modem, or a modem to provide a data communication connection to a corresponding type of telephone line. As another example, network interface 214 may be a local area network (LAN) card to provide a data communication connection to a compatible LAN. Wireless links may also be implemented. In any such implementation, network interface 214 may send and receive electrical, electromagnetic, or optical signals that carry digital data streams representing distinct types of information.

In an embodiment, the DTBAS may include the controller 216. The term "controller" is used herein to refer to any method or system for controlling and should be understood to encompass microprocessors, microcontrollers, programmable digital signal processors, integrated circuits, computer software, computer hardware, electrical circuits, application specific integrated circuits, programmable logic devices, programmable gate arrays, programmable array logic, personal computers, chips, and any other combination of discrete analog, digital, or programmable components, or other devices capable of providing processing functions.

Figure 3:
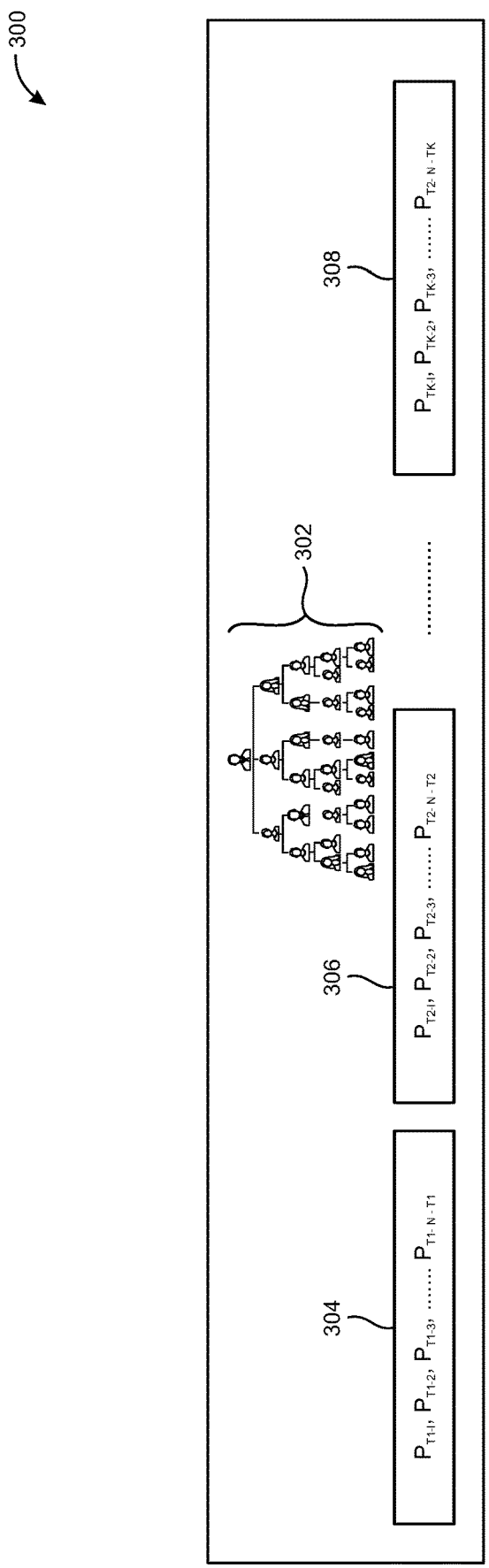
FIG. 3 is an illustration showing an organizational structure 300 of the service providers, according to an exemplary embodiment.

FIG. 3 is an illustration showing an organizational structure 300 of the service providers, according to an exemplary embodiment. FIG. 3 is described in conjunction with FIG. 1 and FIG. 2. In an embodiment, when the service provider 102, for example, may be the healthcare service provider, the healthcare service provider may provide multiple healthcare related services. The service provider 102 may include factions that may work independently or in cooperation for providing the multiple services. The factions may include the personnel, for example, licensed professionals, doctors, relationship managers, human resource workers, delivery managers, or any suitable workers required for providing different scopes of services.

In an embodiment, each faction may include multiple service providers that may be organized in a hierarchy (e.g., 302) and may correspond to a practice group (e.g., 304, 306, 308). Each service provider providing the multiple services may be associated with a trust score. The trust score corresponding to each of the service providers 102 may be dependent on multiple attributes or parameters. For instance, the parameters may include a compliance with the standards of care, skill levels and skills set of the professionals, a patient satisfaction data, a care quality outcome data, an initiative-taking or proactive care outcome data, a scope or service provided by each faction, etc. The overall trust score of a group of service providers may be, for example, aggregated, interpolated, and computed or generated based on the trust scores of each of the service provider 102. In an embodiment, the factions may be classified into different practice groups based on, for example, attributes like qualification, scope of service, license levels, etc. In an embodiment, FIG. 3 shows a representation of the practice groups, for example, $P_{T1-1}$, $P_{T1-2}$ ... $P_{T1-(N-T1)}$302; $P_{T2-1}$, $P_{T2-2}$, $P_{T2-3}$ ... $P_{T2-N-T2}$304; $P_{TK-1}$, $P_{TK-2}$, $P_{TK-3}$ ... $P_{T2-N-TK}$ 306, etc.

Figure 4A:
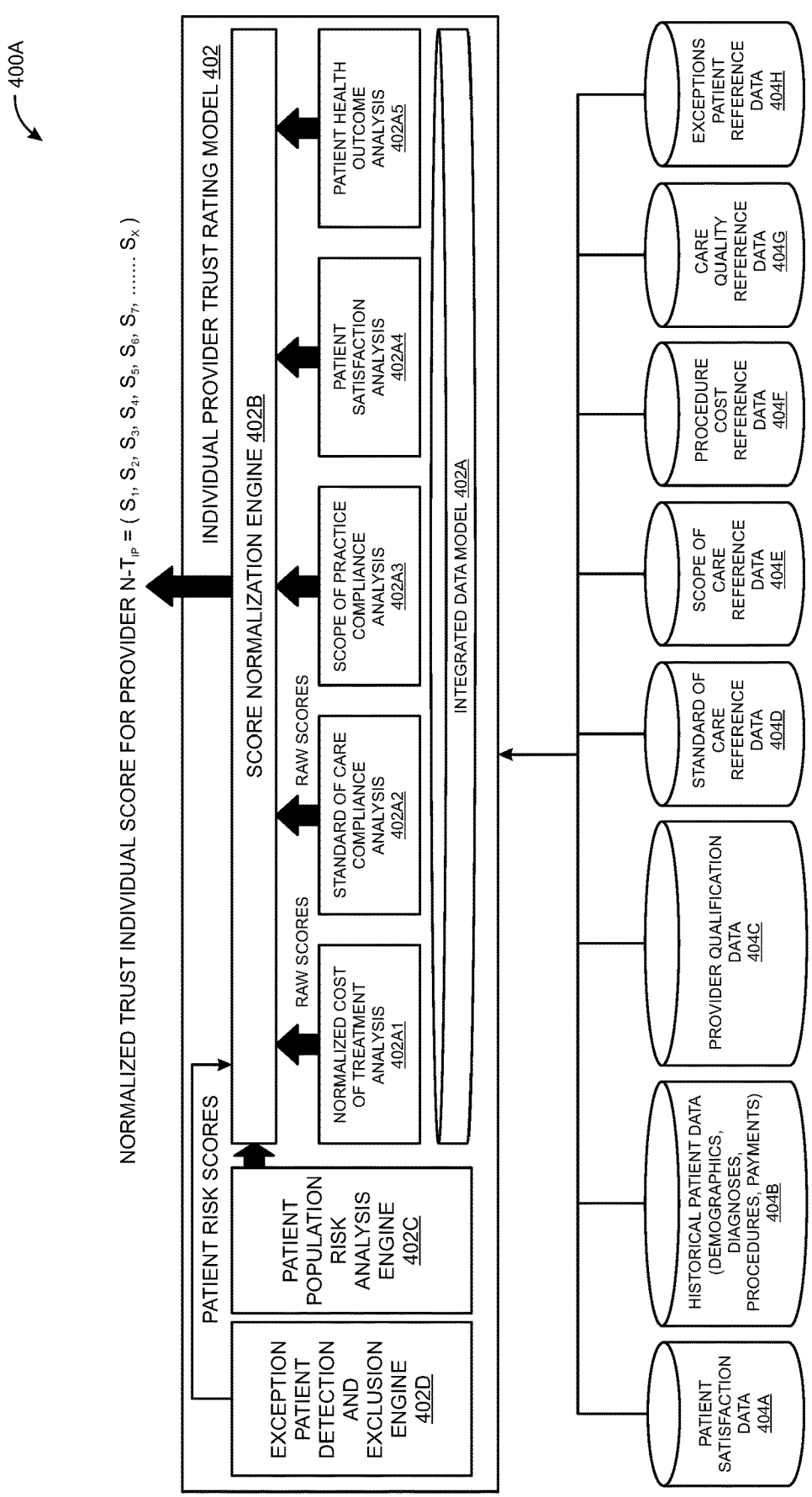
FIG. 4A is an illustration of a computation of a normalized trust score for an individual service provider, according to an exemplary embodiment.

FIG. 4A is an illustration of a computation of a normalized trust score for an individual service provider, according to an exemplary embodiment. With reference to FIG. 4A, there is shown a computation of a normalized trust score for an individual provider or an individual service provider. In an embodiment, the normalized trust score for the individual provider may be computed based on an individual provider trust rating model 402. The individual provider trust rating model 402 may be modelled and may enable computing the normalized score based on information or data that may be interpolated from multiple data sources (e.g., 404A, 404B, 404C, 404D, 404E, 404F, 404G, and 404H). For example, the data or information from the multiple data sources (e.g., 404A, 404B, 404C, 404D, 404E, 404F, 404G, and 404H) may include, for example, a patient satisfaction data 404A, a historical patient data including demographics, diagnosis, procedures, payments, etc. 404B, a provider qualification data 404C, a standard of care reference data 404D, a scope of care reference data 404E, a procedure cost reference data 404F, a care quality reference data 404G, and an exceptions patient reference data 404H. In an embodiment, the individual provider trust rating model 402 may implement engines, circuitries, machine learning engines, a benchmarking engine (as shown and described in FIG. 4B), etc., on the data that is assimilated from multiple data sources (e.g., 404A, 404B, 404C, 404D, 404E, 404F, 404G, and 404H).

In an embodiment, the individual provider trust rating model 402 may execute operations to perform computations and generate a normalized trust score. The normalized trust score may be based on multi-dimensional data inputs, for example, differential population disease burdens and specialty variance, compliance with standards of care, peer benchmarking, a combination of skill levels of the care team and scope of care, cost of treatment, outcome of treatment measure as a continuous metric, patient satisfaction, proactive care actions, etc.

In an embodiment, the engines, circuitries, models, etc., in the individual provider trust rating model 402 may execute operations to generate an integrated data model 402A. The integrated data model 402A may be modeled by excluding the patient data that may be flagged as an exception (e.g., 404H). Further, the individual provider trust rating model 402 may execute operations to perform multi-dimensional analysis. For instance, the engines, circuitries, models, etc., in the individual provider trust rating model 402 may execute operations to compute raw scores based on multi-dimensional analysis on the integrated data model 402A. For example, such multidimensional analysis may be based on and includes a normalized cost of treatment analysis 402A1, a standard of care compliance analysis 402A2, a scope of practice compliance analysis 402A3, a patient satisfaction analysis 402A4, a patient health outcome analysis 402A5, etc. Based on each of the dimensions of the multidimensional analysis, a corresponding raw score may be computed. In an embodiment, the subsequent description provides an exemplary technique for executing operations to perform multidimensional analysis and the other exemplary computations including the raw score.

In an embodiment, the trustworthiness of the providers may be modeled in multiple ways. For instance, trustworthiness may be modeled based on certain hypothesis and historical information or data. For example, for any individual provider or group of providers, historical data including transactions and/or operations executed by the providers may be referenced for generating hypothesis for modeling the trustworthiness. Further, the historical information or data may include multidimensional attributes associated with the data thereby indicating quality of services provided by the providers or the group of providers.

In an embodiment, trustworthiness modeling may include performing computations, for example, statistical distribution analysis of the individual dimension attributes such as a normalized cost of treatment to quantify the overall raw score. In such statistical distributed analysis, an individual provider whose transactions are closer to the central tendencies of the distribution with reference to the overall population across all individual providers may suggest that the provider is likely to be representative of the overall population of the providers. When the providers associated with transactional attributes such as normalized cost of treatment are, for example, closer to a mean value of a corresponding entities across the group of providers or the individual providers, the trustworthiness of such providers may be modeled or attributed as more trustworthy.

In an embodiment, when the providers associated with the transactional attributes such as normalized cost of treatment are, for example, further away from the mean value of the corresponding entities across the group of providers or the individual provider, the trustworthiness of such providers may be modeled or attributed as less trustworthy. The actual quantification of these individual dimension scores may rely on parameters of the distributions of the individual attributes for the providers and parameters of the distribution of the overall provider. For example, consider a hypothesis, where $m_i^j$ is the mean of the $i^{th}$ dimension of the transaction of $j^{th}$ provider and $M_i$ is mean of the corresponding attribute for the population of all providers, the $i^{th}$ dimension score for $j^{th}$ provider may be computed using the equation:

$$\sqrt{\frac{(m_i^j - M_i)^2}{S_i^2}} \quad (1)$$

In an embodiment, attributes or the components of the trust metrics computed from the individual attributes (e.g., multiple dimensions) associated with the operations or transactions may be aggregated to constitute the overall raw trust score. The aggregation may include multiple levels of importance assigned to different dimensions associated with the data based on a respective credibility rating. In an embodiment, the credibility rating for each dimension may be computed and/or assigned. For example, the credibility rating for each dimension may be set uniformly that may be identical for all dimensions; manually assigned based on historical experiences and/or historical data; dynamically assigned based on the operational data or a combination of the above-described mechanisms.

For example, the dynamic weight assignment may be executed as described below. Consider weight $w_i^j$ is assigned to $i^{th}$ attribute of $j^{th}$ provider may be inversely proportional to the standard deviation of the $i^{th}$ attribute of the $j^{th}$ provider defined by $s_i^j$. Specifically, $w_i^j$ may be equal to $1/s_i^j$. Further, the aggregate raw score of the $j^{th}$ provider be computed using the equation:

$$\sum \left( \sqrt{\frac{(m_i^j - M_i)^2}{S_i^2}} * w_i^j \right) \quad (2)$$

In an embodiment, when the statistical attributes or parameters, for example, Mi and si may be unavailable for computing the trust score, an end user may input such attributes by referencing historical or reference data associated with the providers or the group of providers. The reference data may be provided may correspond to specific instance and/or on one time or periodic basis. The above-described mechanism or techniques for computing and/or determining the trustworthiness based on multiple dimensions (e.g., attributes) of the transactional and/or operational data using statistical properties of the distribution is an exemplary mechanism or technique of multidimensional analysis to compute the raw score and may correspond to or be referred to as multidimensional analysis.

In an embodiment, the score normalization engine 402B may receive the corresponding computed raw score, and the patient risk scores. The patient risk scores may be computed by the patient exception detection and exclusion engine 402C and the patient population analysis engine 402D. For example, the patient risk scores may be computed based on the data related to the patient satisfaction data 404A, the historical patient data including demographics, diagnosis, procedures, payments, etc. 404B, the provider qualification data 404C, the standard of care reference data 404D, scope of care reference data 404E, procedure cost reference data 404F, care quality reference data 404G, and exceptions patient reference data 404H. In an embodiment, the score normalization engine 402B may receive scores and may generate or create a matrix. The patient risk scores may be computed and benchmarked with metrics which use standard patient risk rating measures like risk adjustment factor (RAF) scores to compute differential risk across individual service providers. The patient risk scores may provide an indication or metric of differential population risk factor. In an embodiment, the score normalization engine 402B may execute operations to perform computations and generate the normalized trust score for the individual service provider 102.

For example, let us consider that a provider i treats a patient population with average RAF score of ri while reference data has an average RAF score of R, then by applying a linear ratio scaling normalization model, given raw score ti of provider $i^{th}$ may be appropriately linearly scaled in accordance with the equation:

$$t_i * \frac{R}{r_i} \quad (3)$$

Based on equation (3), a normalized score for the providers may be computed when all other aspects associated with the trustworthy factors for $i^{th}$ provider transaction are identical to the reference data. The normalization models may further receive inputs that may not merely include the central tendencies of the distribution, but they may also include other statistical parameters such as standard deviations of the provider and historical and/or reference data. In an embodiment, those skilled in the art may extend the concept of the normalization considering more statistical parameters and using different normalization modelling techniques.

Figure 4B:
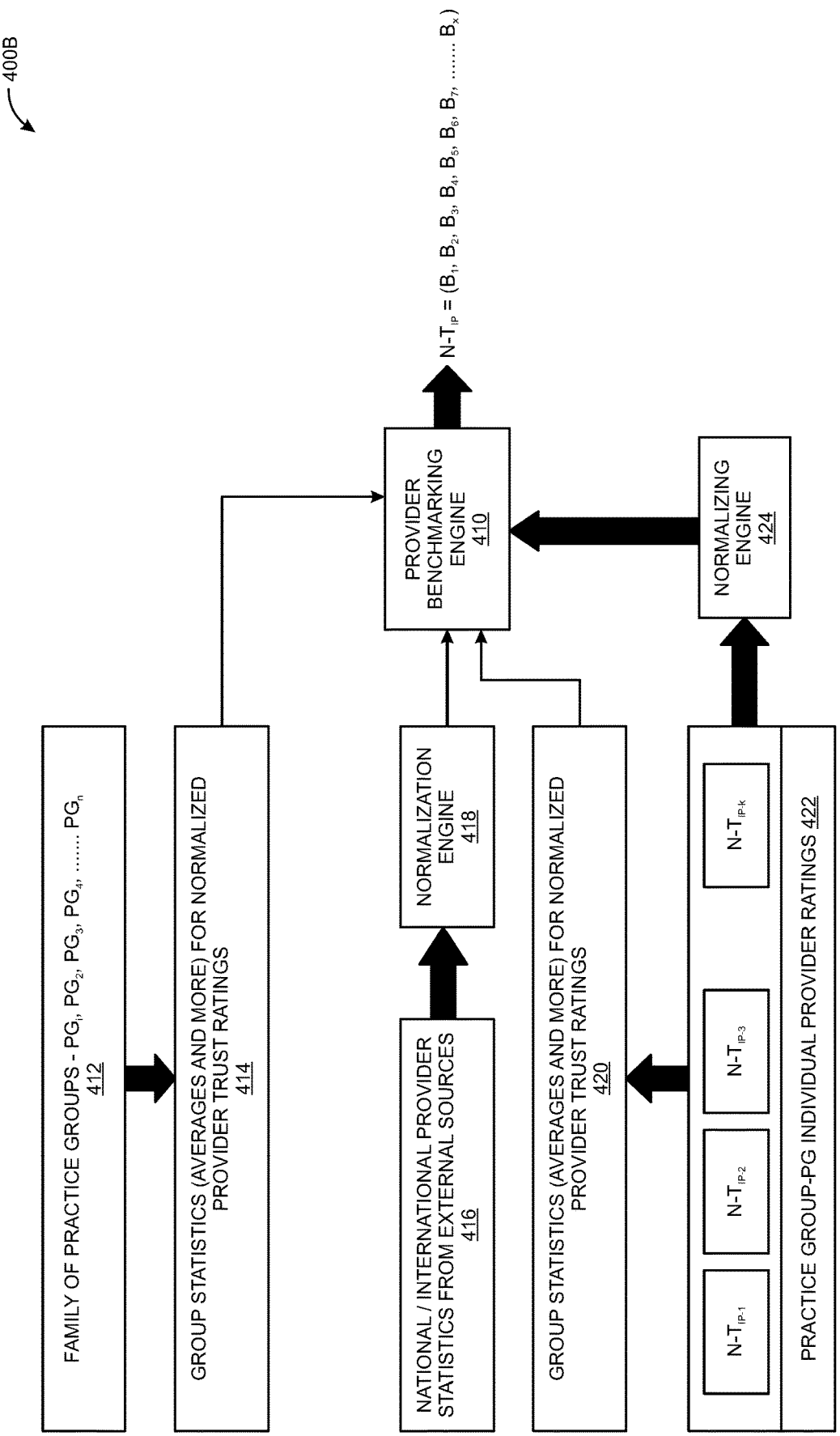
FIG. 4B is an illustration showing a provider benchmarking engine performing multidimensional computations and analysis, according to an exemplary embodiment.

FIG. 4B is an illustration showing a provider benchmarking engine performing multidimensional computations and analysis, according to an exemplary embodiment. With reference to FIG. 4B, there is shown an illustration of a provider benchmarking engine 410 performing a multidimensional computations and analysis. In an embodiment, the provider benchmarking engine 410 may execute operations to perform operations such as analysis and computations based on data or information received from multiple data sources in multiple dimensions. For example, such multidimensional data may include practice group statistics (e.g., 414) that may be based on data related to family practice groups 412, a national/international statistic from external sources 416, and a group statistics (e.g., 420) based on the data or information from a practice group of individual provider ratings 422. In an embodiment, the data from the national/international statistics from external sources 416 may be normalized via execution of operations by a, for example, a first normalizing engine 418. The data from the practice group individual provider ratings 422 may be normalized by a, for example, second normalizing engine 424. In an embodiment, the provider benchmarking engine 410 may execute operations to compute benchmarking information based on the trust sores for the individual provider. In an embodiment, the individual service provider may be ranked in a specific order based on the normalized trust scores.

Figure 5A:
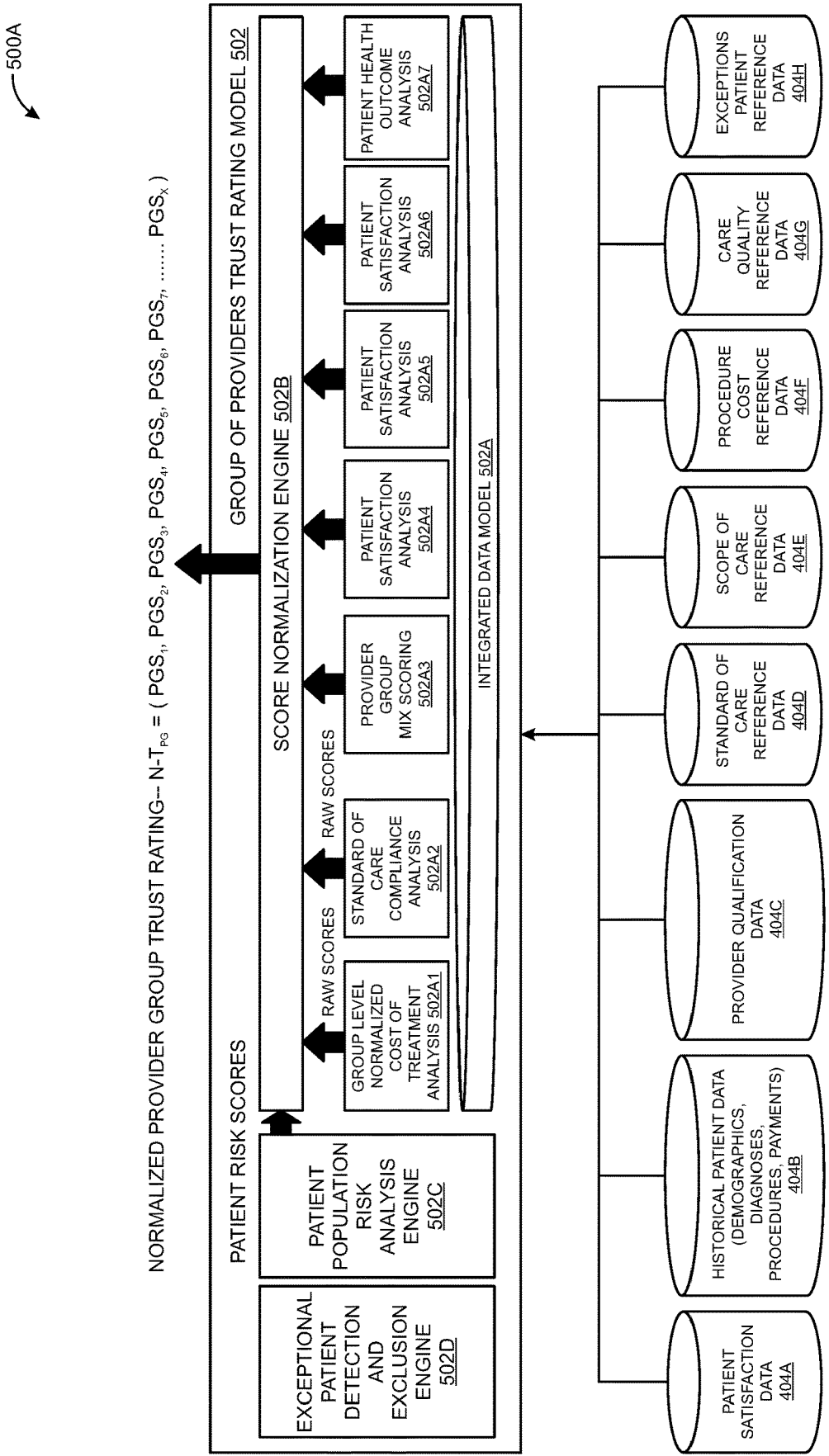
FIG. 5A is an illustration of a computation of a normalized trust score for a group of service providers, according to an exemplary embodiment.

FIG. 5A is an illustration of a computation of a normalized trust score for a group of service providers, according to an exemplary embodiment. FIG. 5A is described in conjunction with FIG. 4A and FIG. 4B. With reference to FIG. 5A, there is shown a computation of a normalized trust score for a group of service providers or a group of providers. In an embodiment, the group of providers may be in a same network of the hospital ecosystem or may belong to another hospital ecosystem. The normalized trust score for the group of providers may be computed based on, for example, a group of providers trust rating model 502. The group of providers trust rating model 502 may be modelled and enable computing the normalized score based on information or data that may be interpolated from multiple data sources (e.g., 404A, 404B, 404C, 404D, 404E, 404F, 404G, and 404H). For example, the data or information from the multiple data sources (e.g., 404A, 404B, 404C, 404D, 404E, 404F, 404G, and 404H) may include, for example, a patient satisfaction data 404A, a historical patient data including demographics, diagnosis, procedures, payments, etc. 404B, a provider qualification data 404C, a standard of care reference data 404D, a scope of care reference data 404E, a procedure cost reference data 404F, a care quality reference data 404G, and an exceptions patient reference data 404H. In an embodiment, the group of providers trust rating model 502 may implement engines, circuitries, machine learning engines, benchmarking engine (as shown and described with reference to FIG. 4B), etc., on the data that is assimilated from multiple data sources.

In an embodiment, the group of providers trust rating model 502 may implement an execution of routines to perform computations and generate a normalized trust score. The normalized trust score may be based on multi-dimensional data inputs, for example, differential population disease burdens and specialty variance, compliance with standards of care, peer benchmarking, a combination of skill levels of the care team and scope of care, cost of treatment, outcome of treatment measure as a continuous metric, patient satisfaction, proactive care actions, etc.

In an embodiment, the engines, circuitries, models, etc., in providers group trust rating model 502 may execute operations to generate an integrated data mode 502A1. The integrated data model 502A may be modeled by excluding the patient data that may be flagged as an exception (e.g., 404H). Further, the providers group trust rating model 502 may execute operations to perform multi-dimensional analysis. For instance, the engines, circuitries, models, etc., in the providers group trust rating model 502 may execute operations to compute raw scores based on multidimensional analysis on the integrated data model 502A. For example, such multidimensional analysis may be based on and includes a normalized cost of treatment analysis 502A1, a standard of care compliance analysis 502A2, a scope of practice compliance analysis 502A3, a patient satisfaction analysis 502A4, a patient health outcome analysis 502A5, etc. Based on each of the aforementioned dimensions of the multidimensional analysis, a corresponding raw score may be computed.

In an embodiment, the score normalization engine 502B may receive the corresponding computed raw score, and patient risk scores. The patient risk scores may be computed by the patient exception detection and exclusion engine 502C and the patient population analysis engine 502D based on the data related to the patient satisfaction data 404A, the historical patient data including demographics, diagnosis, procedures, payments, etc. 404B, the provider qualification data 404C, the standard of care reference data 404D, scope of care reference data 404E, procedure cost reference data 404F, care quality reference data 404G, and exceptions patient reference data 404H. In an embodiment, the score normalization engine 502B may receive scores based on the above-described multidimensional analysis and may generate or create a matrix. The patient risk scores may be computed and benchmarked with metrics which use standard patient risk rating measures like risk adjustment factor (RAF) scores to compute differential risk across individual service providers. The patient risk scores may provide an indication or metric of differential population risk factor. In an embodiment, the score normalization engine 502B may execute operations to perform computations and generate the normalized trust score for the group of service providers.

Figure 5B:
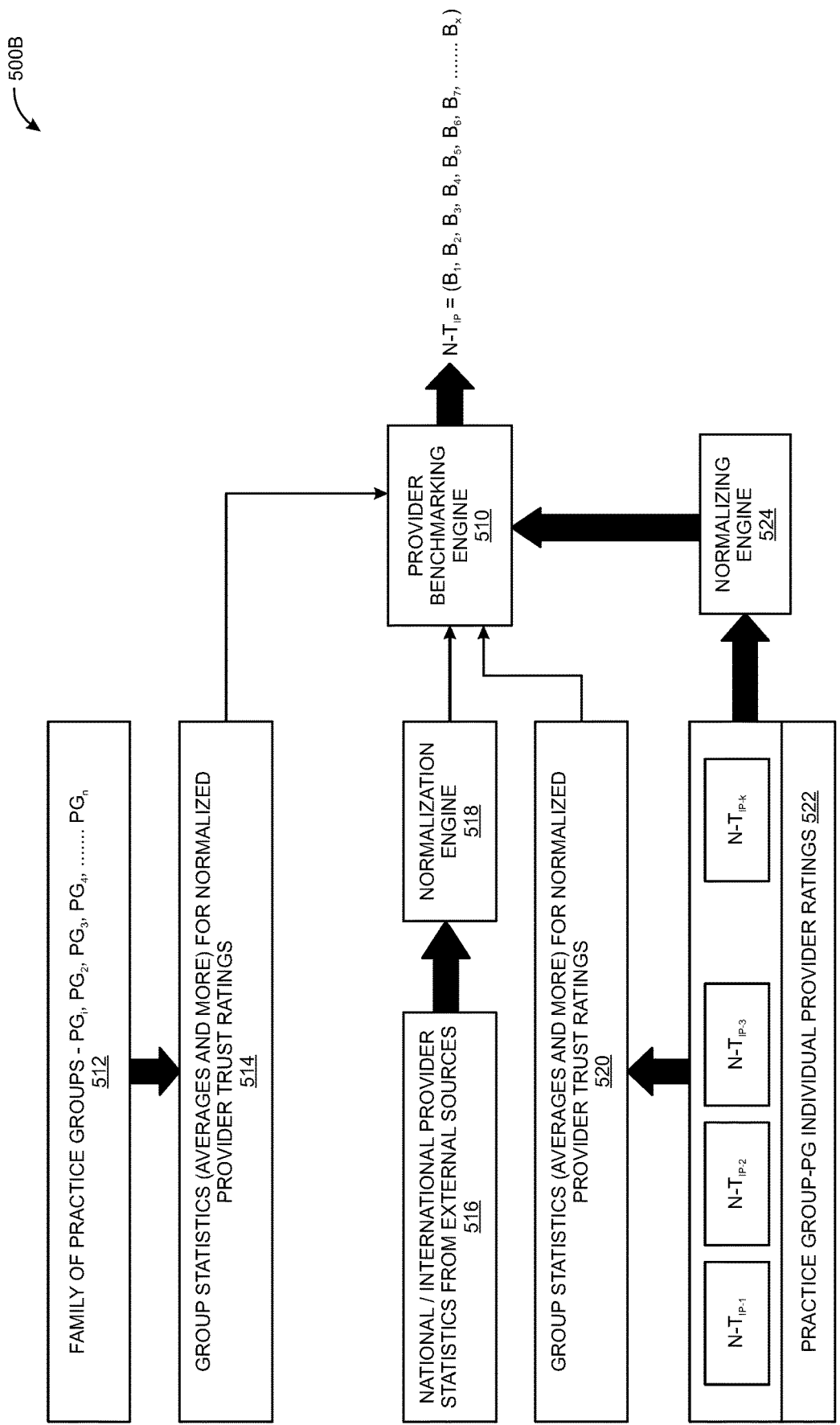
FIG. 5B is an illustration showing a provider benchmarking engine performing multidimensional computations and analysis, according to an exemplary embodiment.

FIG. 5B is an illustration showing a provider benchmarking engine performing multidimensional computations and analysis, according to an exemplary embodiment. With reference to FIG. 5B, there is shown an illustration of a provider benchmarking engine 510 performing multidimensional computations and analysis performed by. In an embodiment, the provider benchmarking engine 510 may execute operations to perform operations such as analysis and computations based on data or information received from multiple data sources in multiple dimensions. For example, such multidimensional data may include practice group statistics (e.g., 514) that are based on data related to family practice groups 512, national/international statistics from external sources 516, and group statistics (e.g., 520) based on the data or information from a practice group of individual provider ratings 522. In an embodiment, the data from the national/international statistics from external sources 416 may be normalized via execution of operations by a, for example, a first normalizing engine 518. The data from the practice group individual provider ratings 522 may be normalized by a, for example, second normalizing engine 524. In an embodiment, the provider benchmarking engine 510 may execute operations to compute benchmarking information based on the trust sores for the group of service providers. In an embodiment, the group of service providers may be ranked in a specific order based on the trust scores.

Figure 6:
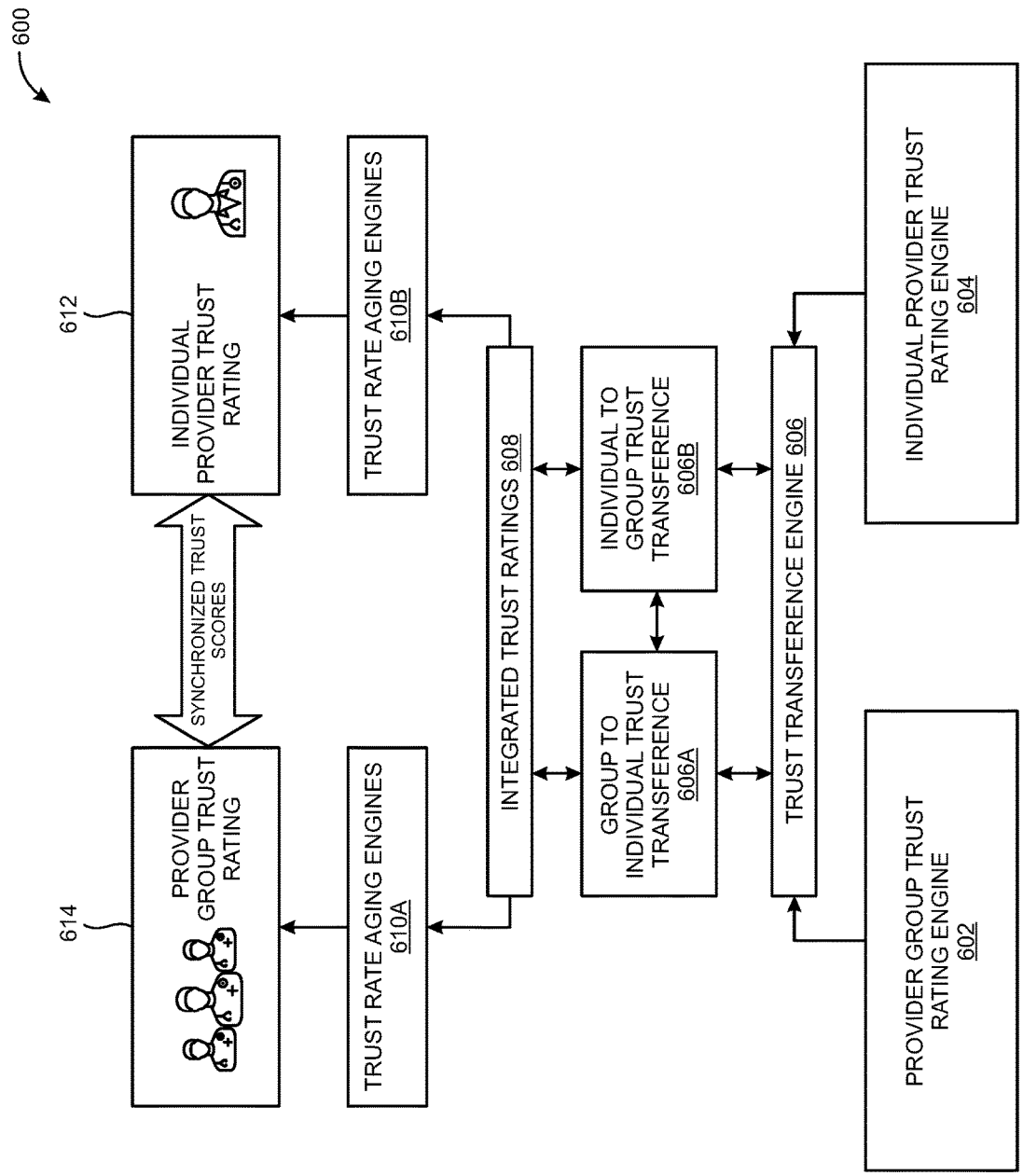
FIG. 6 is a block diagram illustrating a dynamic trust rating framework 600, according to an exemplary embodiment.

FIG. 6 is a block diagram illustrating a dynamic trust rating framework 600, according to an exemplary embodiment. FIG. 6 is described in conjunction with FIG. 4A, FIG. 4B, FIG. 5A and FIG. 5B. With reference to FIG. 6, there is shown an illustration including a dynamic trust rating framework (DTRF) 600. In an embodiment, the DTRF 600 may implement multiple circuitries, engines, logics, code, etc., to execute specific operations, either independently or in cooperation with each other. For instance, the DTRF 600 may implement an execution of the specific operations via the engines, for example, a providers group trust rating engine 602, an individual provider trust rating engine 604, a trust transference engine 606, an integrated trust rating engine 608, trust ageing engines (e.g., 610A and 610B), etc.

In an embodiment, the DTRF 600 may generate a trust score for each of an individual service provider 612 and a providers group trust score 614. As explained in the detailed description with reference to FIG. 4A, FIG. 4B and FIG. 5, the individual provider trust rating engine and the group of providers trust rating engine may receive, process, analyze and perform computations based on multi-dimensional input data. Further, DTRF 600 may execute operations to generate the corresponding trust scores (e.g., 612 and 614) based on multidimensional data. Such multidimensional data may include information corresponding to differential population disease burdens and specialty variance, compliance with standards of care, peer benchmarking, a combination of skill levels of the care team and scope of care, cost of treatment, outcome of treatment measure as a continuous metric, patient satisfaction, proactive care actions, etc.

In an embodiment, the trust transference engine 606 may execute operations to map the individual service providers to specific groups based on the trust score of the individual service providers. The trust transference engine 606 may further execute operations to evaluate the trust score of each individual service provider and may aggregate them into specific groups. The aggregation of the individual service providers to specific groups of providers may influence the trust score associated with the group of providers.

In an embodiment, the trust transference engine 606 may be configured to execute operations to evaluate the trust score of each individual service provider from the providers group and execute a decision, for example, to retain or exclude the individual service provider from the group of providers. Further, the trust transference engine 606 may be able to compute or generate an integrated trust ratings (e.g., 608), based on the execution of the aforementioned operations. In an embodiment, the trust transference engine 606 may execute operations for updating the trust scores associated with the individual service provider or the group of service providers based on incremental changes or modifications in the data. The influence of the incremental data modifications on the existing trust score may be dynamically learned by the trust transference engine 606 based on real time data that may include feedback from users.

In an embodiment, the trust rate ageing engines 610A, 610B may work in cooperation with the trust transference engine 606 to modify or update the trust score associated with the individual service provider or the group of service providers. The trust rate ageing engines 610A, 610B may execute operations for performing an analysis and determining the influence or impact of historical data on the corresponding trust scores (e.g., 612, 614). In an embodiment, the trust rate ageing engines 610A, 610B may execute operations to determine historical data and exclude it from influencing or impacting current trust scores (e.g., 612, 614). In an embodiment, the corresponding trust scores (e.g., 612, 614) may be modified or updated by cooperative working of the trust provider group trust rating engine 602, the individual provider trust rating engine 604, the trust transference engine 606 and the trust rate ageing engines 610A, 610B.

Figure 7:
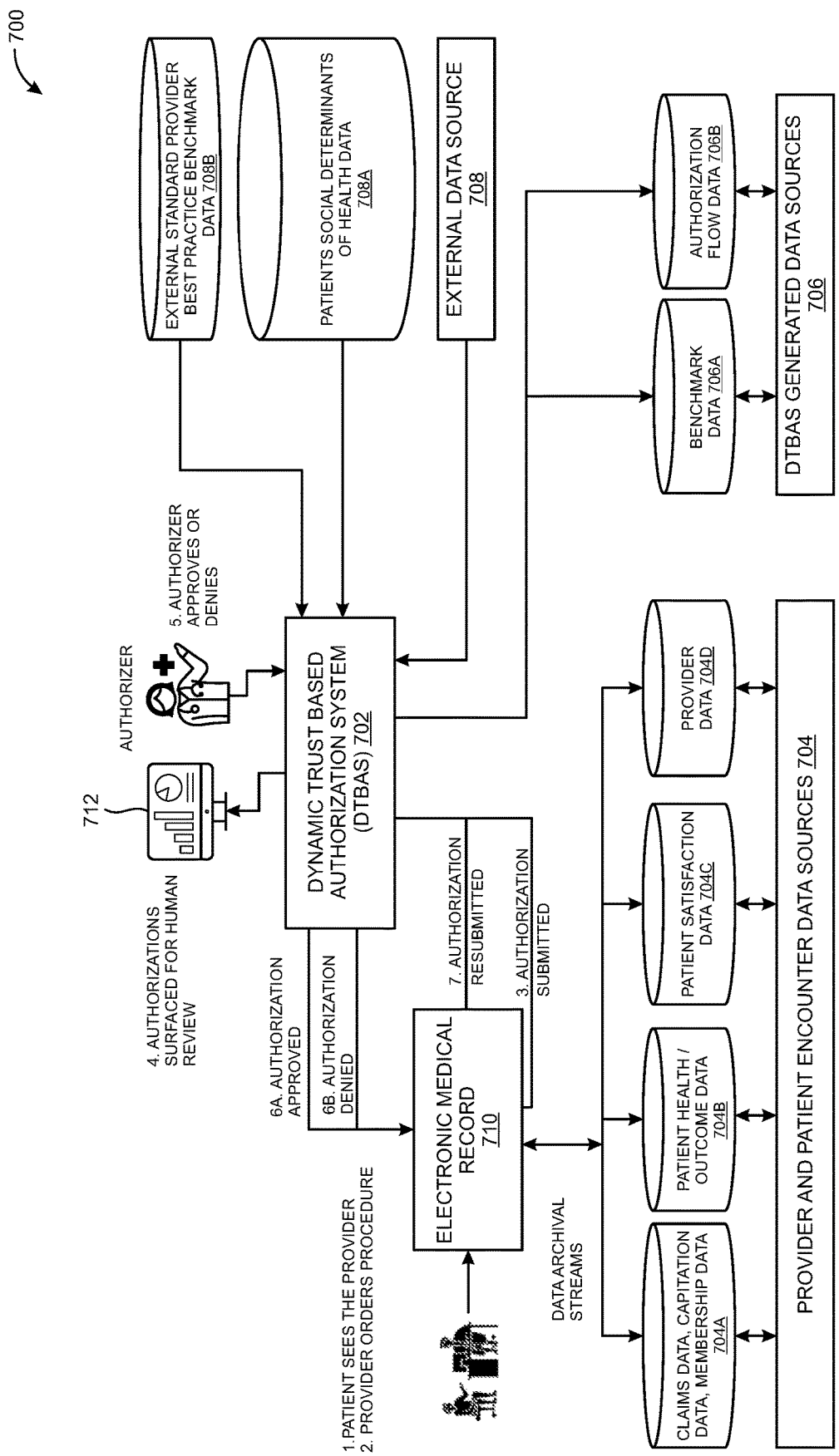
FIG. 7 is a block diagram illustrating a deployment 700 of the DTBAS in a hospital ecosystem, according to an exemplary embodiment.

FIG. 7 is a block diagram illustrating a deployment 700 of the DTBAS in a hospital ecosystem, according to an exemplary embodiment. With reference to FIG. 7, there is shown an illustration of the deployment of the DTBAS 702 in the hospital ecosystem. In an embodiment, the DTBAS 702 may implement the execution of multiple circuitries, engines, models, etc. (e.g., as shown and described with respect to FIGS. 1-6), to execute specific operations. For example, such operations may include performing computations, analysis, data normalization, extrapolation, transformation, etc. The DTBAS 702 may execute the above-described operations on information including data assimilated from multiple data sources (e.g., 704, 706, 708 and 710).

In an embodiment, the data sources may include internal data sources or external data source (e.g., 708, 708A, and 708B) including data identifiers and information related to operations, processes, actions, etc., associated with an entity or an organization. The external data source (e.g., 708) may include data or information corresponding to patients social health determinants of health data and external standard provider best practice benchmark data 708B. When the entity is a hospital, the data sources may include data or information related to one or more service providers, patients, patient encounter data (e.g., 704, 704A, 704B, 704C and 704D), DTBAS generated data (e.g., 706) including health insurance claims data also referred to as claims data 706A, capitation data 706B, membership data 706B, patient health and/or outcome data, patient satisfaction data, provider data, etc. The patient health and/or outcome data 704B may represent an electronic medical record (EMR) 710, patient satisfaction data 704C and provider data 704D. In an embodiment, the provider data 704D may correspond to individual service provider data or group of providers data. The DTBAS generated data 706 may include a benchmark data 706A, an authorization flow data 706B, etc.

In an embodiment, the DTBAS 702 may include multiple circuitries, decision logics, engines, etc. (not shown), that may work independently or in cooperation to execute operations. For example, the modules or engines of the DTBAS 702 may execute operations to enable dynamic trust-based authorization for executing operations or tasks. Such dynamic trust-based authorization may be based on the trust score. In an embodiment, the DTBAS 702 may be configured to make computations based on various attributes or parameters. For example, such attributes or parameters may include determining trustworthiness of individuals (e.g., licensed professionals, doctors, nurses, support staff, etc.), individual service providers, groups of service providers, served entities, serving entities, managed entities and managing entities. The aforementioned determination of trustworthiness may be computed with respect to time and may be on parameters, for example, previous outcomes, competence, credibility, integrity, patient satisfaction data, etc.

In an embodiment, the deployment 700 as illustrated in FIG. 7 shows that a patient may visit the healthcare facility, for example, the healthcare facility provider (e.g., shown as Step 1. Patient sees the provider). Upon visiting the healthcare facility, the doctor attending to the patient (e.g., served entity 108) may order or submit a request of performing a medical diagnosis and/or a surgical procedure (e.g., shown as Step 2. Provider orders procedure). The requested medical diagnosis and/or the surgical procedure may need an authorization for its execution, which may be received by the DTBAS 702 (e.g., shown as Step 3. Authorization submitted). The DTBAS 702 may execute operations to perform operations, such as analysis, determinations, evaluations, verifications, computations, etc., and provide the submitted medical diagnosis and/or surgical procedures on a dashboard or user interface 712 for review. For example, an authorized or qualified end user may review the submitted request for the medical diagnosis and/or the surgical procedure. (e.g., shown as Step 4. Authorizations surfaced for human review).

In an embodiment, the authorized or qualified end user may either approve or deny the execution of the submitted request (e.g., shown as Step 5. Authorizer approves or denies). When the authorization is denied, request may be resubmitted to the DTBAS 702 (e.g., shown as Step 7. Authorization resubmitted.) Upon receiving the resubmitted request, the DTBAS 702 may execute operations (as described with reference to FIGS. 1-7) and based on the trust score, may either approve authorization (e.g., shown as Step 6A. Authorization approved) or deny authorization (e.g., shown as Step 6B. Authorization denied) to execute the requested medical diagnosis and/or surgical procedure.

Figure 8:
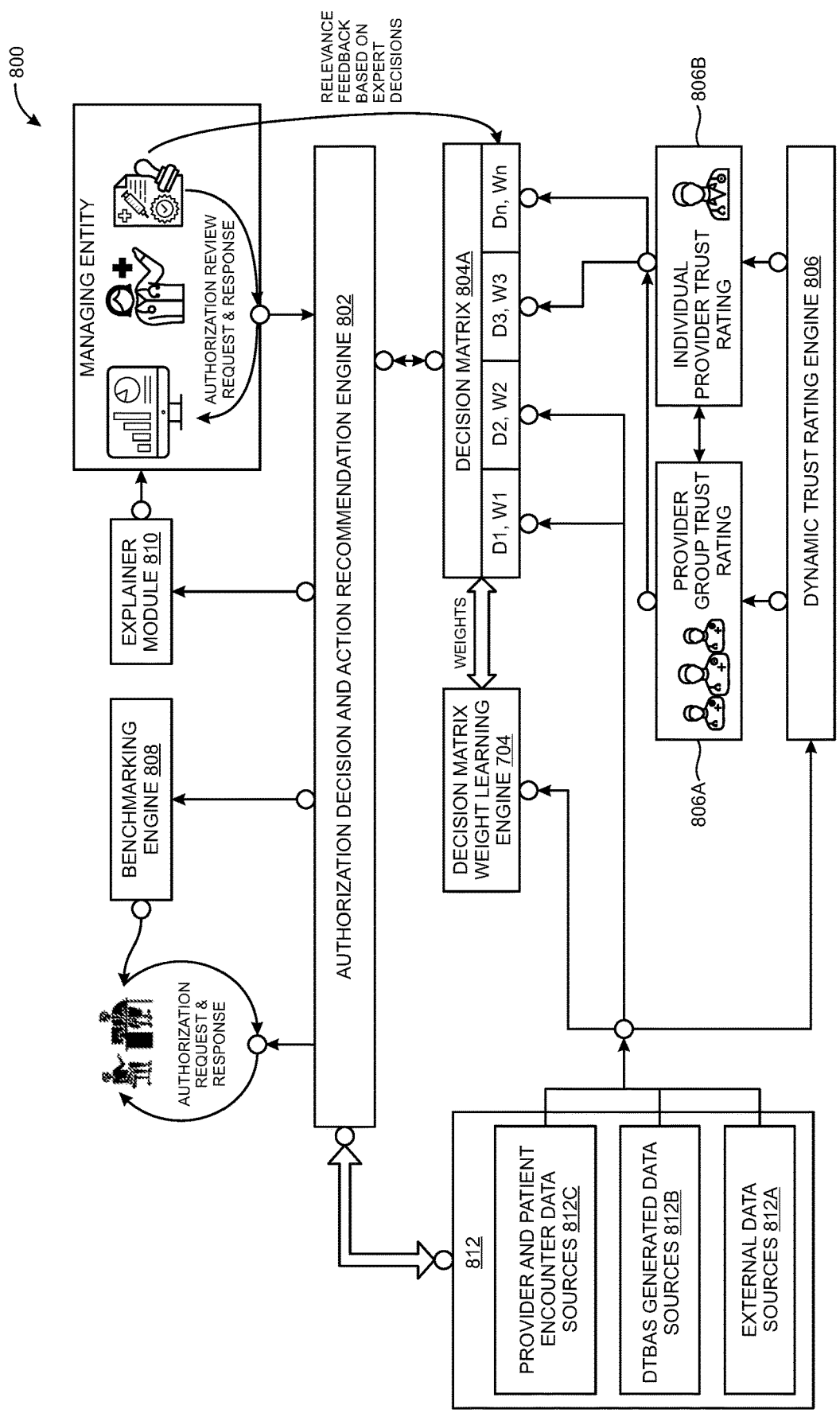
FIG. 8 is a block diagram illustrating components of the dynamic trust-based authorization system, according to an exemplary embodiment.

FIG. 8 is a block diagram illustrating components of the dynamic trust-based authorization system, according to an exemplary embodiment. FIG. 8 is described in conjunction with FIG. 7. With reference to FIG. 8, there is shown an illustration of components of the DTBAS 702. In an embodiment, the DTBAS 702 may implement an execution of engines, modules, models, circuitries, components, etc., to execute specific operations. For instance, the DTBAS 702 may include an authorization decision and action recommendation engine 802, a decision matrix weight learning engine 804, a dynamic trust rating engine 806, a benchmarking engine 808, an explainer module 810 that may be communicatively coupled with data sources 812 (e.g., 812A, 812B and 812C).

In an embodiment, the authorization decision and action recommendation engine 802 may receiving information or data from the multiple data sources 812. For example, the multiple data sources 812 may include external data sources 812A, DTBAS generated data sources 812B, and a provider and patient encountered data sources 812C. The authorization decision and action recommendation engine 802 may execute operations to implement a decision logic to automatically authorize requested services by the served entity or the end user. The authorization decision and action recommendation engine 802 may use a combination of factors to execute operations, such as automatically authorize services or escalate services for human review with a recommendation, or automatically deny services. The authorization decision and action recommendation engine 802 uses a combination of a multi-dimensional weighted decision matrix that may include an "approvability score" based on multiple sets of factors including the service provider trust rating, a peer benchmarking score/ranking, the attributes or parameters of the service requested, the parameters of the member/patient for whom the service is requested. In an embodiment, the weights in the decision matrix may be based on data corresponding to, for example historical factors, real time factors. The decision matrix weight learning engine 804 may automatically learn or be trained to learn based on human inputs and ongoing changes or modifications to the operational metrics of authorization decision and action recommendation engine 802. In an embodiment, for each new authorization request, the decision matrix weight learning engine 804 may be configured to use the decision matrix with its current weights and cooperatively work with the authorization decision and action recommendation engine 802. The weights may be modified or changed based on a combination of factors or parameters, such as provider trust, needs of the patient, cost of treatment, etc.

In an embodiment, decision matrix weight learning engine 804 may execute operations to perform computations and generate a decision matrix. The decision matrix may include multiple decisions and an associated corresponding weight corresponding to each decision. The decision matrix may be generated based multiple dimensions of data and the historical decision parameters to generate the approvability score. In an embodiment, the multi-dimensional weighted decision matrix which includes the approvability score, may be computed based on multiple attributes or parameters. For example, the multiple attributes or parameters may include the individual service provider trust score, a peer benchmarking score based on the trust scores of groups of providers, the attributes or parameters associated with the service requested, the attributes or parameters associated with the patient requesting the service, etc. The weights of the decision matrix may vary based on, for example, historical data associated with the patient, real time data associated with the patent, modification in health-related parameters associated with the patient, etc.

In an embodiment, the explainer module 810 may be configured to execute operations for generating visualizations based on the computation of the dynamic trust rating engine 806 and the authorization decision and action recommendation engine 802. The explainer module 810 may be configured to execute operations for performing analysis and providing explanations based on the analysis, and inputs from other sources including escalations and when a human intervention is needed.

In an embodiment, the multiple data sources 812 may include external data sources 812A, DTBAS generated data sources 812B, and a provider and patient encountered data sources 812C. For example, such data or information may correspond to a standard provider data, a best practice benchmark data, patient's social determinants of health data, external third-party data, etc.

Figure 9A:
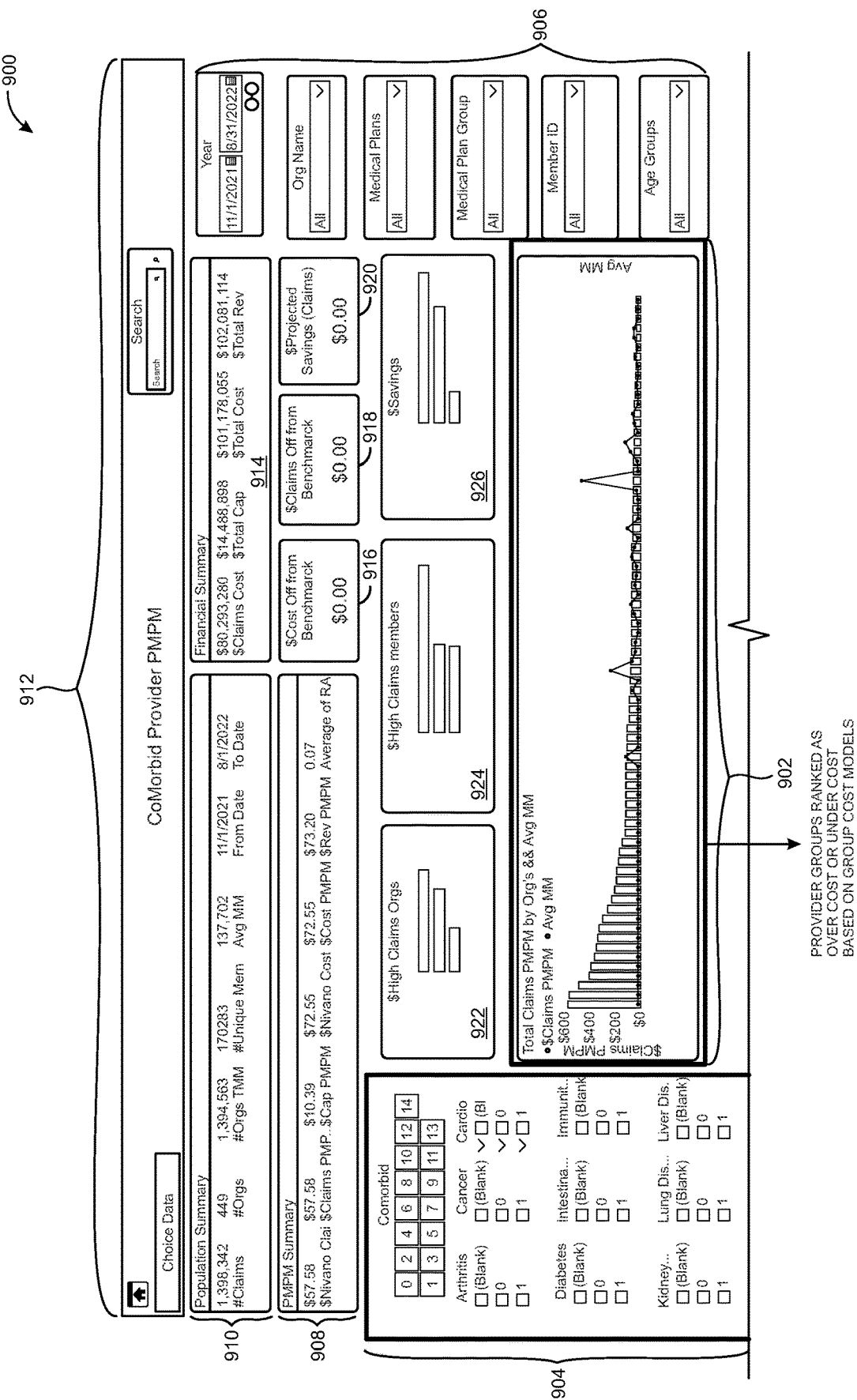
Figure 9B:
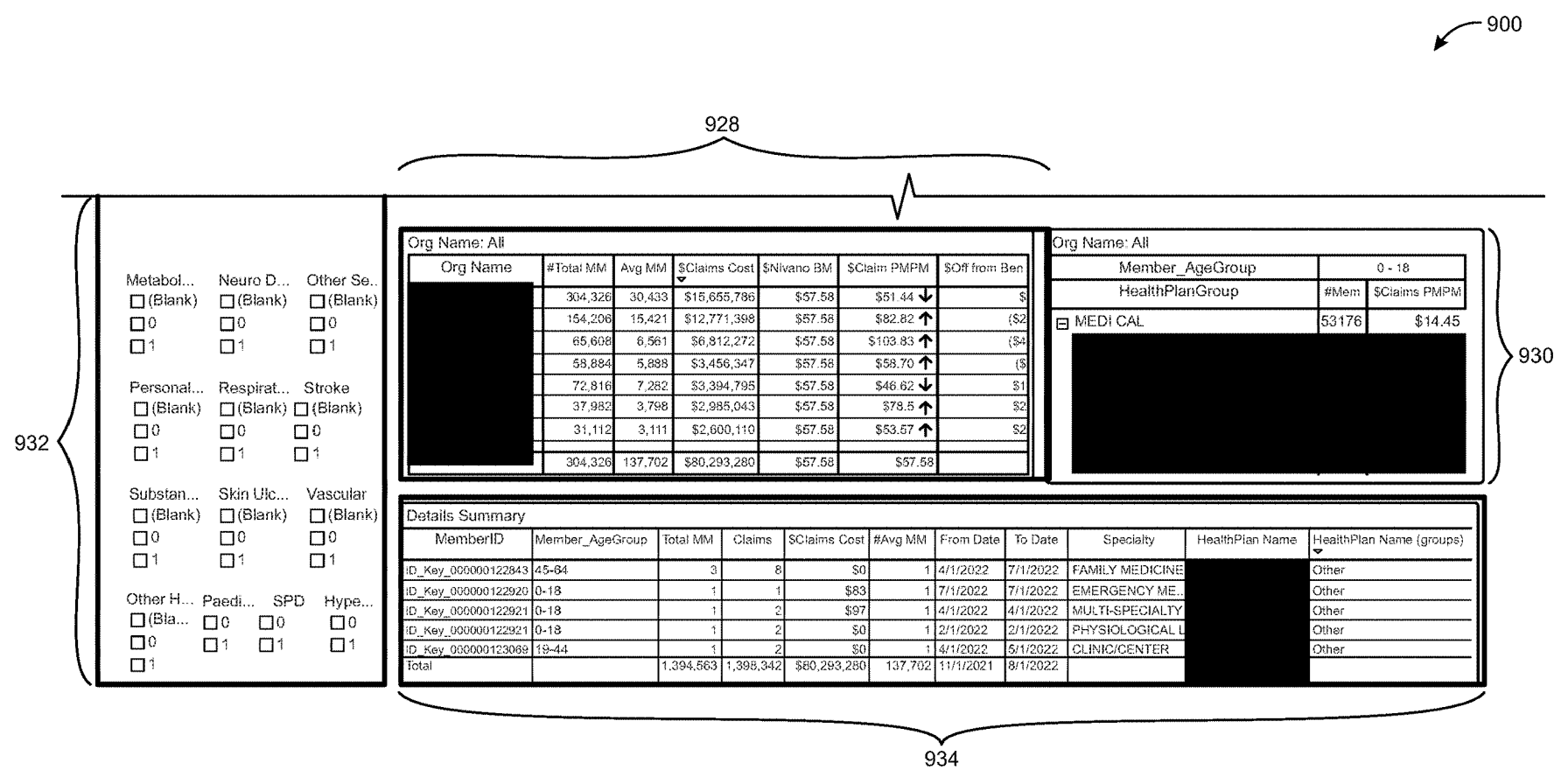

FIGS. 9A and 9B are an illustration showing a dashboard 900 that displays information based an analysis performed by the DTBAS, according to an exemplary embodiment. FIGS. 9A and 9B are described in conjunction with FIG. 7. With reference to FIG. 9A, there is shown a dashboard 900 (e.g., a graphical user interface (GUI)) that includes information or data based on an execution or operations or functions based on a cost modeling factor that may be further modified or controlled based on the patient risk factors. In an embodiment, the dashboard 900A shows multiple user interface elements (e.g., 902, 904, 906, 908, 910, 912, 914, 916, 918, 920, 922, 924, and 926). Each UI element displays data or information, or statistics in the form of visualizations, tables, and other forms of UI elements, which are generated based on execution of operations by the DTBAS 702. For example, the UI element 902 may correspond to a graphical visualization showing information group of service providers ranked as "over cost" or "under cost" based on group of providers trust rating model and cost models. The UI element 904 may correspond to controllable risk factors for patients.

With reference to FIG. 9B, there is a shown a continuation of the dashboard 900 that may include user interface elements (e.g., 928, 930, 932, and 934). In an embodiment, each UI element displays data or information, or statistics in the form of visualizations, tables and other forms of UI elements, which are generated based on the execution of operations by the DTBAS 702. For example, UI element shown with reference numeral 928 may correspond to cost averages by organization and UI element 934 may correspond to the patient members adding to the cost. The patient members adding to cost may be associated with many risk factors (e.g., as shown in 904 and 932) that may optionally be selected, and the corresponding cost related information may be modified.

FIG. 10 is an illustration showing a dashboard 1000 that displays information based on an analysis performed by the DTBAS, according to an exemplary embodiment. FIG. 10 is described in conjunction with FIG. 7. With reference to FIG. 10, there is shown a dashboard 1000 (e.g., a graphical user interface (GUI)) that displays information related to, for example, group of cross providers referral metrics used for benchmarking 1002 and selected group of providers metrics 1004 to be compared for benchmarking (e.g., as shown in 1002). The information including data (e.g., 1002 and 1004) displayed on the dashboard 1000 may be based on the execution of operations by DTBAS 702 as shown and described with reference to FIG. 7.

FIG. 11 is an illustration showing a dashboard 1100 displaying information based on an analysis by the DTBAS, according to an exemplary embodiment. FIG. 11 is described in conjunction with FIG. 7 and FIG. 8. With reference to FIG. 11, there is shown a dashboard 1100 (e.g., a graphical user interface (GUI)) displaying information that includes a service requested by the served entity or the patient. In an embodiment, the dashboard 1100 shows service requests that need authorizations (e.g., 1102, 1104, and 1106). Based in the execution of operations by the DTBAS 702, as shown and described with reference to FIG. 7, the dashboard 1100 of FIG. 11 shows that the service request corresponding to 1106 has been flagged by the DTBAS 702 and may need further intervention. For example, a human intervention may be needed to understand the details of the request, who may further provide inputs that may be received and analyzed by the DTBAS 702. For example, the service request corresponding to 1106 may include information that needs a further scrutinization or information and based on this information may lead to authorization or denial of the requested service by the DTBAS 702.

FIG. 12 is an illustration showing a dashboard 1200 displaying information based on an analysis by the DTBAS, according to an exemplary embodiment. FIG. 12 is described in conjunction with FIG. 7 and FIG. 8. With reference to FIG. 12, there is shown a dashboard 1200 (e.g., a graphical user interface (GUI)) displaying information that may include a list of service requests (e.g., 1202, 1204, 1206, 1208, 1210, 1212, 1214, and 1216) that may need authorization for their execution. In an embodiment, as shown and described with reference to FIG. 7 and FIG. 8. The DTBAS 702 may execute operations, perform computations and analysis, and provide further input. For example, the DTBAS 702 may execute the above-described operations with reference to FIG. 7 and FIG. 8 and may provide a recommendation of the service request that may be apt or authorized for further execution.

Figure 13:
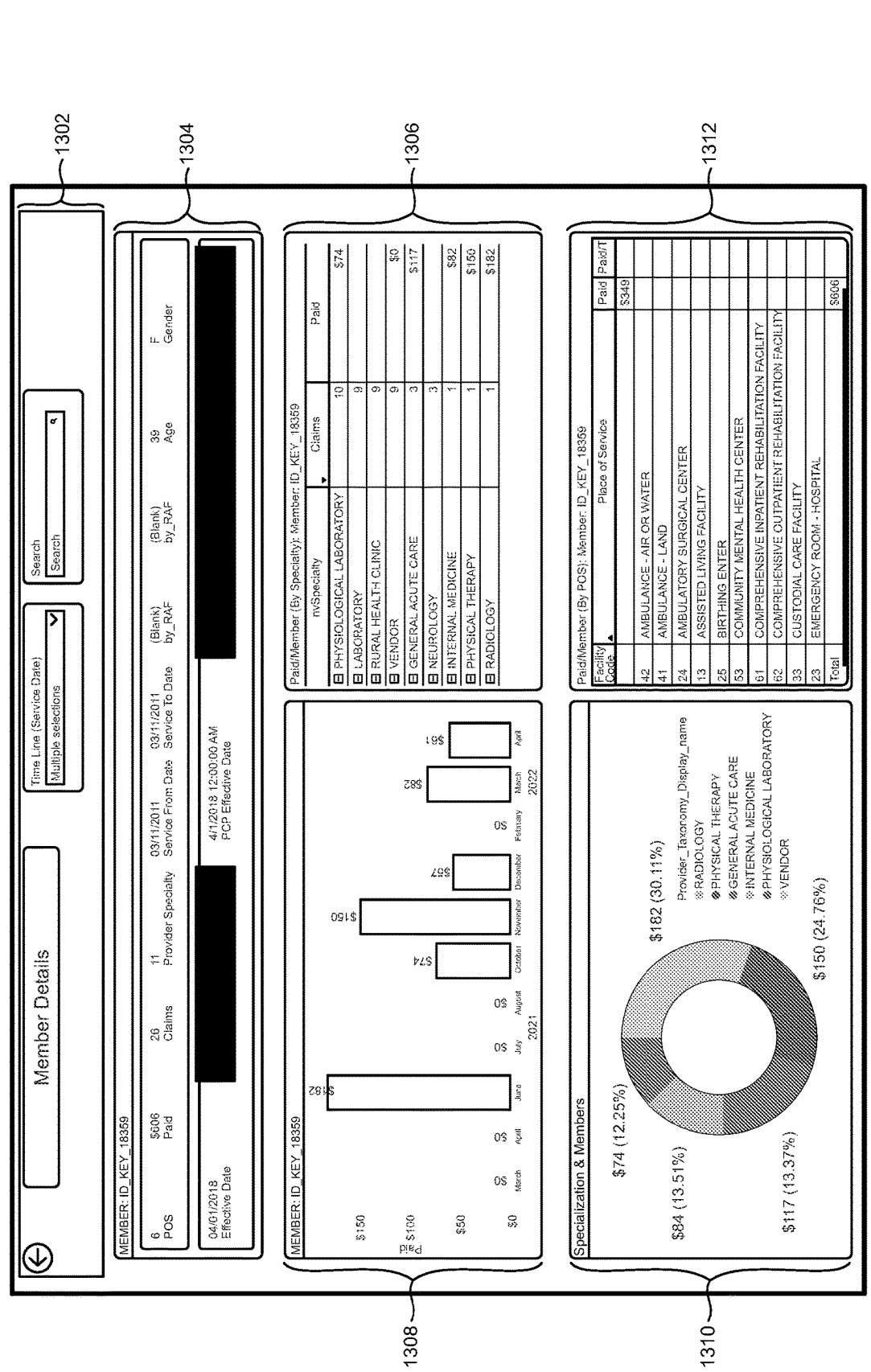
FIG. 13 is an illustration showing a dashboard displaying information based on an analysis by the DTBAS, according to an exemplary embodiment.

FIG. 13 is an illustration showing a dashboard 1300 displaying information based on an analysis by the DTBAS, according to an exemplary embodiment. FIG. 13 may be described in conjunction with FIG. 7 and FIG. 8. With reference to FIG. 13, there is shown a dashboard that displays information based on the analysis by the DTBAS 702. For example, the information displayed on dashboard 1300 (e.g., a graphical user interface (GUI)) corresponds to a historical information of a patient. The dashboard 1300 includes UI elements showing information of the patient. For example, the UI elements shown may include patient details (e.g., 1302), medical tests and diagnosis and a corresponding expenditure related information (e.g., 1304, 1306 and 1312), a graphical visualization of classification of medical expenditures (e.g., 1310) based on diagnosis, monthly or yearly medical expenditures (e.g., 1308), etc. In an embodiment, as explained with reference to FIG. 7 and FIG. 8, the DTBAS 702 may provide the information displayed on dashboard 1300 that may provide longitudinal patient history that may need or to be provided for human intervention. For instance, such information may be vital for establishing a context as to why a request for authorization for a specific request for the service may need further intervention and/or why the specific request for the service may not have been automatically approved (e.g., explainer module 810 may execute operations and may provide the above referenced information or details).

Figure 14:
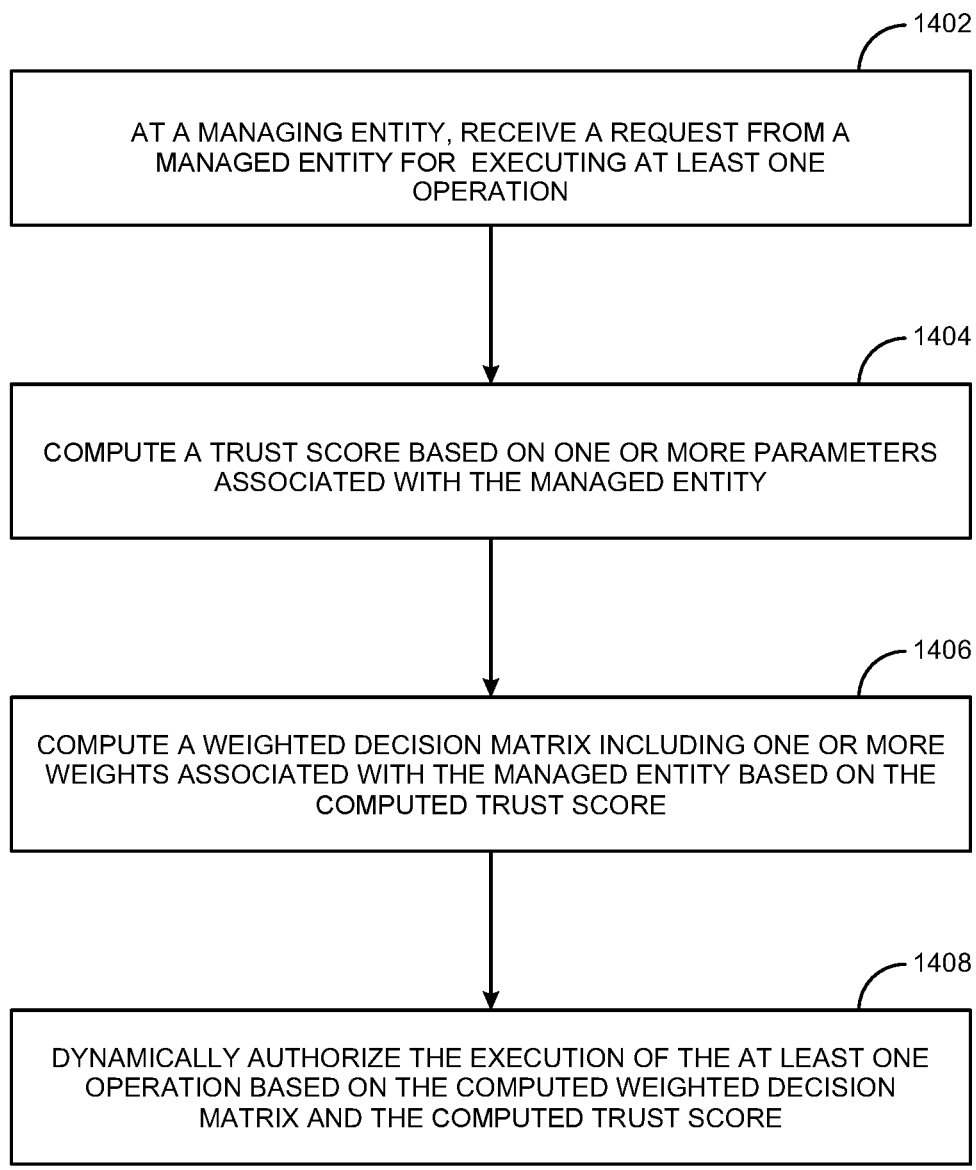
FIG. 14 is an illustration showing a flow diagram that implements operations of the DTBAS, according to an exemplary embodiment.

FIG. 14 is an illustration showing a flow diagram that implements operations of the DTBAS, according to an exemplary embodiment. FIG. 14 is described in conjunction to FIG. 2, FIG. 5A, FIG. 5B, FIG. 6, FIG. 7 and FIG. 8. With reference to FIG. 14, there is shown a flow diagram 1400 including a process that implements the operations of the DTBAS 702. In an embodiment, at a managing entity, a request from a managed entity for executing an operation is received, at 1402. For example, the managing entity may be the hospital and the managed entity may be a service provider. The managed entity may be authorized to provide services to the served entity, for example, the patients. Based on one or more parameters associated with the managed entity, a normalized trust score is computed, at 1402. The normalized trust score may be associated with the service provider and the computation of the normalized trust score is as explained with reference to FIG. 5A and FIG. 5B. The normalized trust score may be computed based on multi-dimensional computations on the data from multiple data sources in multiple dimensions.

In an embodiment, based on the computed normalized trust score, a weight decision matrix including one or more weights associated with the managed entity is computed, at 1406. The weight decision matrix may include multiple weights that may be associated with the approvability score(s). The approvability score(s) may be based on multiple factors associated with the managed entity, for example, the service provider. The weighted decision matrix includes data representing multiple decisions and an associated corresponding weight for each decision. Based on the computed weight decision matrix and the computed normalized trust score, the execution of the operation is dynamically authorized, at 1408. For example, the managed entity or the service provider may receive an automatic approval of request for authorization for performing specific tasks or operations. The implementation of the execution of the steps 1402, 1404, 1406, and 1408 of the flow diagram 1400 are described with reference to detailed description of FIG. 2, FIG. 7 and FIG. 8.

Figure 15:
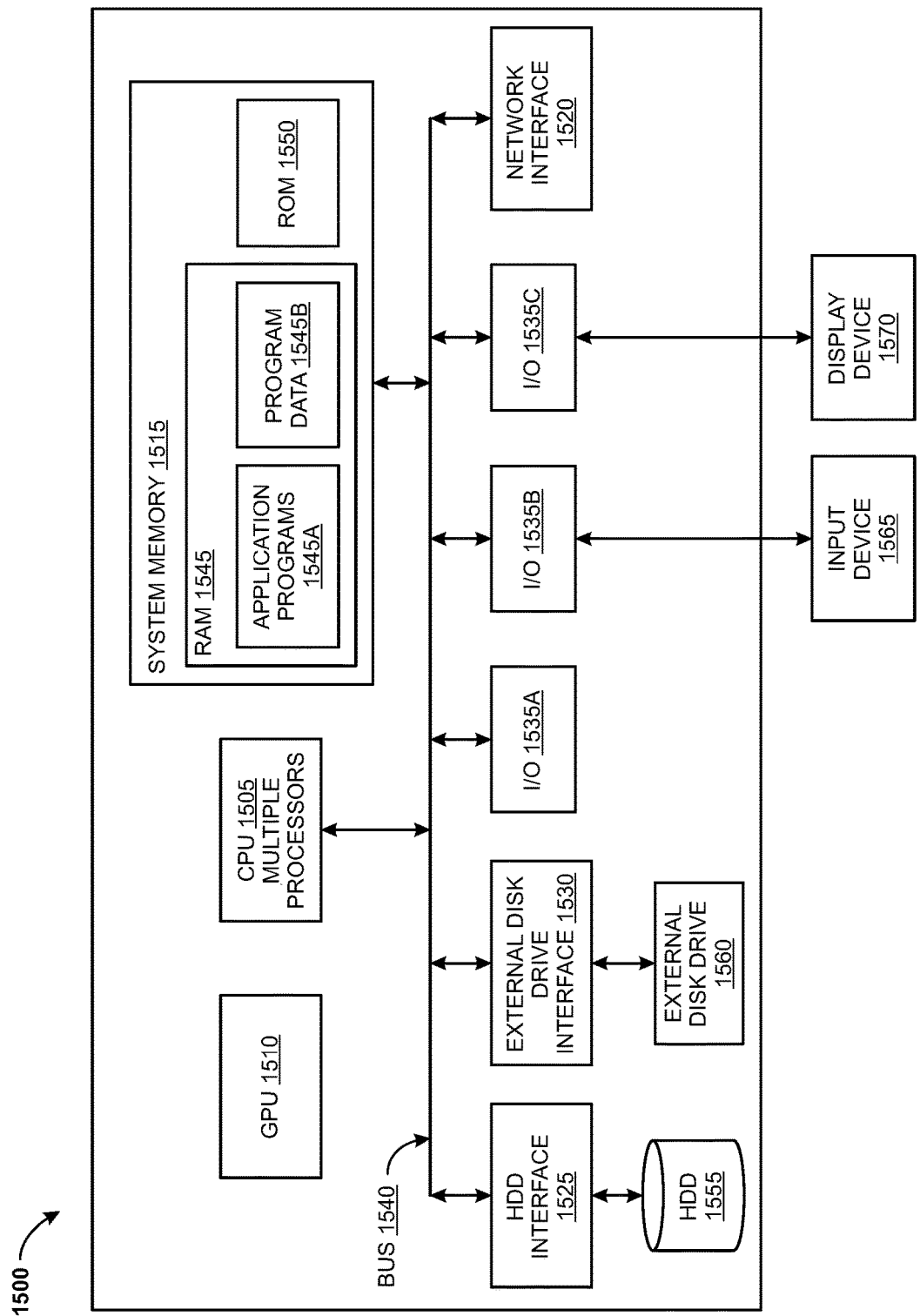
FIG. 15 shows an exemplary hardware configuration of computer 1500 that may be used to implement components of DTBAS, according to exemplary embodiments.

FIG. 15 shows an exemplary hardware configuration of computer 1500 that may be used to implement components of DTBAS, according to exemplary embodiments. The computer 1500 shown in FIG. 15 includes CPU 1505, GPU 1510, system memory 1515, network interface 1520, hard disk drive (HDD) interface 1525, external disk drive interface 1530 and input/output (I/O) interfaces 1535A, 1535B, 1535C. These elements of the computer are coupled to each other via system bus 1540. The CPU 1505 may perform arithmetic, logic and/or control operations by accessing system memory 1515. The CPU 1505 may implement the processors of the exemplary devices and/or system described above. The GPU 1510 may perform operations for processing graphic or AI tasks. In case computer 1500 is used for implementing exemplary central processing device, GPU 1510 may be GPU 1510 of the exemplary central processing device as described above. The computer 1500 does not necessarily include GPU 1510, for example, in case computer 1500 is used for implementing a device other than central processing device. The system memory 1515 may store information and/or instructions for use in combination with the CPU 1505. The information and/or instructions may be for implementing the execution of the engines in DTBAS 702. The system memory 1515 may include volatile and non-volatile memory, such as random-access memory (RAM) 1545 and read only memory (ROM) 1550. A basic input/output system (BIOS) containing the basic routines that helps to transfer information between elements within the computer 1500, such as during start-up, may be stored in ROM 1550. The system bus 1540 may be any of several types of bus structures including a memory bus or memory controller, a peripheral bus, and a local bus using any of a variety of bus architectures. The computer may include network interface 1520 for communicating with other computers and/or devices via a network.

Further, the computer may include hard disk drive (HDD) 1555 for reading from and writing to a hard disk (not shown), and external disk drive 1560 for reading from or writing to a removable disk (not shown). The removable disk may be a magnetic disk for a magnetic disk drive or an optical disk such as a CD ROM for an optical disk drive. The HDD 1555 and external disk drive 1560 are connected to the system bus 1540 by HDD interface 1525 and external disk drive interface 1530, respectively. The drives and their associated non-transitory computer-readable media provide non-volatile storage of computer-readable instructions, data structures, program modules and other data for the general-purpose computer. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

Several program modules may be stored on the hard disk, external disk, ROM 1550, or RAM 1545, including an operating system (not shown), one or more application programs 1545A, other program modules (not shown), and program data 1545B. The application programs may include at least a part of the functionality as described above.

The computer 1500 may be connected to input device 1565 such as mouse and/or keyboard and display device 1570 such as liquid crystal display, via corresponding I/O interfaces 1535A to 1535C and the system bus 1540. In addition to an implementation using a computer 1500 as shown in FIG. 15, a part or all the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

One or more embodiments are now described with reference to the drawings, wherein like reference numerals are used to refer to like elements throughout. In the following description, for purposes of explanation, numerous specific details are set forth to provide a thorough understanding of the various embodiments. It is evident, however, that the various embodiments can be practiced without these specific details (and without applying to any networked environment or standard).

As used in this application, in some embodiments, the terms "component." "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made considering the above detailed description. Rather, the scope is to be determined by the following claims, which are to be interpreted in accordance with established doctrines of claim construction.

What is claimed is:

1. A dynamic trust-based authorization system for dynamically authorizing a request, the dynamic trust-based authorization system comprising:
   a processor; and
   a memory storing instructions that are executed by the processor, to:
   receive data from multiple data sources by an authorization decision and action recommendation engine;
   at a managing entity, receive a request from a managed entity for executing at least one operation, wherein the at least one operation is performed by the managed entity;
   based on one or more parameters associated with the managed entity, compute a normalized trust score associated with the managed entity by performing multi-dimensional computations on the data from the multiple data sources in multiple dimensions;
   receive real time data and an associated modification of health-related parameters of a patient;
   based on the received real time data, train a first machine (ML) engine to learn an influence of incremental modifications to the real time data on the normalized trust score;
   based on ongoing changes or modifications to operational metrics of the authorization decision and action recommendation engine, train a second ML engine;
   based on the incremental modifications to the real time data by the trained first ML engine, update the normalized trust score;
   based on the updated normalized trust score, compute, by the second ML engine, a weighted decision matrix including one or more weights associated with the managed entity, wherein the weighted decision matrix includes one or more of an approvability score based on a plurality of factors associated with the managed entity, and wherein the weighted decision matrix includes data representing multiple decisions and an associated corresponding weight for each decision;
   dynamically update weights of the weighted decision matrix based on the real time data and the associated modification of the health-related parameters of the patient;
   based on the updated weights of the computed weighted decision matrix and the computed normalized trust score, dynamically authorize the execution of the at least one operation; and
   based on the real time data, automatically update information on a graphical user interface, wherein the information is associated with the normalized trust score.

2. The dynamic trust-based authorization system of claim 1, wherein the managed entity is at least one service provider from a plurality of service providers.

3. The dynamic trust-based authorization system of claim 1, wherein the one or more parameters associated with the managed entity is at least one of an individual rating of the at least one service provider, a group rating of the plurality of service providers, a type of service provided by the at least one service provider, and a compliance information.

4. The dynamic trust-based authorization system of claim 1, wherein the one or more weights of the weighted decision matrix are computed based on a plurality of factors including a plurality of records associated with a historical information and a real time information associated with the requested at least operation.

5. The dynamic trust-based authorization system of claim 1, further comprises:
   a decision matrix weight learning engine.

6. A method for dynamic trust-based authorization of a request, comprising:
   receiving data from multiple data sources by an authorization decision and action recommendation engine;
   at a managing entity, receiving a request from a managed entity for executing at least one operation, wherein the at least one operation is performed by the managed entity;
   based on one or more parameters associated with the managed entity, computing a normalized trust score associated with the managed entity by performing multi-dimensional computations on the data from the multiple data sources in multiple dimensions;
   receiving real time data and an associated modification of health-related parameters of a patient;
   based on the received real time data, training a first machine (ML) engine to learn an influence of incremental modifications to the real time data on the normalized trust score;
   based on ongoing changes or modifications to operational metrics of the authorization decision and action recommendation engine, train a second ML engine;
   based on the incremental modifications to the real time data by the trained first ML engine, update the normalized trust score;
   based on the updated normalized trust score, computing, by the second ML engine, a weighted decision matrix including one or more weights associated with the managed entity, wherein the weighted decision matrix includes one or more of an approvability score based on a plurality of factors associated with the managed entity, and wherein the weighted decision matrix includes data representing multiple decisions and an associated corresponding weight for each decision;
   dynamically updating weights of the weighted decision matrix based on the real time data and the associated modification of the health-related parameters of the patient;
   based on the updated weights of the computed weighted decision matrix and the computed normalized trust score, dynamically authorizing the execution of the at least one operation; and
   based on the real time data, automatically updating information on a graphical user interface, wherein the information is associated with the normalized trust score.

7. The method of claim 6, wherein the managed entity is at least one service provider from a plurality of service providers.

8. The method of claim 6, wherein the one or more parameters associated with the managed entity is at least one of an individual rating of the at least one service provider, a group rating of the plurality of service providers, a type of service provided by the at least one service provider, and a compliance information.

9. The method of claim 6, wherein the one or more weights of the weighted decision matrix are computed based on a plurality of factors including a plurality of records associated with a historical information and a real time information associated with the requested at least operation.

10. A non-transitory computer-readable device having instructions stored thereon that, when executed by at least one computing device, cause the at least one computing device to perform operations comprising:
  receiving data from multiple data sources by an authorization decision and action recommendation engine;
  at a managing entity, receiving a request from a managed entity for executing at least one operation, wherein the at least one operation is performed by the managed entity;
  based on one or more parameters associated with the managed entity, computing a normalized trust score associated with the managed entity by performing multi-dimensional computations on the data from the multiple data sources in multiple dimensions;
  receiving real time data and an associated modification of health-related parameters of a patient;
  based on the received real time data, training a first machine (ML) engine to learn an influence of incremental modifications to the real time data on the normalized trust score;
  based on ongoing changes or modifications to operational metrics of the authorization decision and action recommendation engine, train a second ML engine;
  based on the incremental modifications to the real time data by the trained first ML engine, update the normalized trust score;
  based on the updated normalized trust score, computing, by the second ML engine, a weighted decision matrix including one or more weights associated with the managed entity, wherein the weighted decision matrix includes one or more of an approvability score based on a plurality of factors associated with the managed entity, and wherein the weighted decision matrix includes data representing multiple decisions and an associated corresponding weight for each decision;
  dynamically updating weights of the weighted decision matrix based on the real time data and the associated modification of the health-related parameters of the patient;
  based on the updated weights of the computed weighted decision matrix and the computed normalized trust score, dynamically authorizing the execution of the at least one operation; and
  based on the real time data, automatically updating information on a graphical user interface, wherein the information is associated with the normalized trust score.

11. The non-transitory computer-readable device of claim 10, wherein the managed entity is at least one service provider from a plurality of service providers.

12. The non-transitory computer-readable device of claim 10, wherein the one or more parameters associated with the managed entity is at least one of an individual rating of the at least one service provider, a group rating of the plurality of service providers, a type of service provided by the at least one service provider, and a compliance information.

13. The non-transitory computer-readable device of claim 10, wherein the one or more weights of the weighted decision matrix are computed based on a plurality of factors including records associated with a historical information and a real time information associated with the requested at least operation.

14. The non-transitory computer-readable device of claim 10, wherein the one or more weights are updated dynamically in real time.

* * * * *